United States Patent [19]
Bishoff et al.

[11] Patent Number: 6,058,646
[45] Date of Patent: May 9, 2000

[54] METHODS AND APPARATUS FOR PEST MONITORING OR CONTROL

[75] Inventors: Michael J. Bishoff, Westfield; Thomas F. Linnen, Jr., Fishers; Dennis G. Wujek, Zionsville; Anton Arnoldy, Brownsburg, all of Ind.

[73] Assignee: Dow AgroSciences LLC, Indianapolis, Ind.

[21] Appl. No.: 08/834,337

[22] Filed: Apr. 16, 1997

Related U.S. Application Data

[60] Provisional application No. 60/016,422, Apr. 29, 1996.

[51] Int. Cl.[7] ............................................... A01M 1/20
[52] U.S. Cl. ........................... 43/131; 43/124; 43/132.1; 220/3.7
[58] Field of Search .................................. 43/124, 132.1, 43/131, 107, 123; 220/3.7, 3.8, 4.03, 7.84

[56] References Cited

U.S. PATENT DOCUMENTS

| | | |
|---|---|---|
| 1,013,514 | 1/1912 | Rand . |
| 2,088,335 | 7/1937 | Michaels .................................. 43/131 |
| 2,837,861 | 6/1958 | Graham, Sr. . |

(List continued on next page.)

FOREIGN PATENT DOCUMENTS

| | | |
|---|---|---|
| 503403 | 9/1979 | Australia . |
| 503416 | 9/1979 | Australia . |
| 0069879 | 1/1983 | European Pat. Off. . |
| 0587116A1 | 3/1994 | European Pat. Off. . |
| 0587117A1 | 3/1994 | European Pat. Off. . |
| 2556562 | 6/1985 | France ..................................... 43/131 |
| 1319401 | 12/1989 | Japan . |
| H026787 | 2/1990 | Japan . |
| 3-31683 | 5/1991 | Japan . |
| H0348162 | 7/1991 | Japan . |
| 4-21449 | 4/1992 | Japan . |
| 148775 | 10/1952 | United Kingdom ...................... 43/131 |
| 1561901 | 3/1980 | United Kingdom . |
| 1597293 | 9/1981 | United Kingdom . |
| WO9100007 | 1/1991 | WIPO . |
| WO 93/23998 | 12/1993 | WIPO . |
| WO9404034 | 3/1994 | WIPO . |
| WO 96/32009 | 10/1996 | WIPO . |

OTHER PUBLICATIONS

"In our never–ending quest to improve termite control, we finally hit the wall."; FMC Corporation, 1996; Single Sheet.
"Now, a new weapon for fighting termites at the source."; FMC Corporation, Jun. 1996; Copy of pamphlet—Two Sheets.
"Now, you can really have termites up against the wall."; FMC Corporation, Jun. 1996; Copy of pamphlet—Two Sheets.
"The FirstLine™ Termite Bait Station"; FMC Corporation, Jun. 1996; Tech Update—Single Sheet (double sided).
Beard; "Termite Biology & Bait–block method of control"; The Connecticut Agricultural Experiment Station, New Haven; Bulletin 748; Nov., 1974; pp. 3–19.
Esenther et al.; "Subterreanean Termite Studies in Southern Ontario"; The Canadian Entomologist; vol. 100; Aug. 1968; pp. 827–834.

(List continued on next page.)

*Primary Examiner*—Thomas B. Will
*Assistant Examiner*—Arpad Fabian Kovacs
*Attorney, Agent, or Firm*—Kenneth L. Loertscher

[57] ABSTRACT

Methods and apparatus for monitoring or controlling pests typically in an above-ground setting are provided, particularly those harmful social insects which live in colonies and communicate through chemical signals, such as termites. Included are a pest-edible matrix, a plurality of interchangeable housings, each defining an interior chamber capable of holding the matrix, a device for removably connecting each of the housings to at least one other of the housings whereby the interior chambers are disposed in communication with each other through orifices defined in the housings, a device for mounting at least one of the housings to a mounting surface proximate to the pests, whereby the housings may be detached from each other, rearranged, eliminated, supplemented, and reattached while the matrices are provided within an environment that has relatively restricted air movement and controlled moisture evaporation.

72 Claims, 22 Drawing Sheets

U.S. PATENT DOCUMENTS

| | | |
|---|---|---|
| 3,017,717 | 1/1962 | Caubre . |
| 3,173,223 | 3/1965 | Dunn et al. ............................ 43/131 |
| 3,624,953 | 12/1971 | Crosby . |
| 3,858,346 | 1/1975 | Bailey . |
| 3,906,656 | 9/1975 | Burke et al. ............................ 43/131 |
| 3,940,875 | 3/1976 | Basile . |
| 3,972,993 | 8/1976 | Kobayashi et al. . |
| 4,043,073 | 8/1977 | Basile . |
| 4,626,528 | 12/1986 | McHenry . |
| 4,747,230 | 5/1988 | Zalesky ................................ 43/121 |
| 4,945,673 | 8/1990 | Lavelle . |
| 4,970,822 | 11/1990 | Sherman ............................... 43/131 |
| 5,027,546 | 7/1991 | Tallon . |
| 5,046,280 | 9/1991 | Foster .................................... 43/131 |
| 5,057,315 | 10/1991 | Gunner et al. ......................... 424/93 |
| 5,057,316 | 10/1991 | Gunner et al. ......................... 424/93 |
| 5,114,037 | 5/1992 | Hillis et al. ......................... 220/4.03 |
| 5,151,443 | 9/1992 | Henrick ................................. 514/486 |
| 5,329,726 | 7/1994 | Thorne et al. ......................... 43/124 |
| 5,555,672 | 9/1996 | Thorne et al. ......................... 43/124 |
| 5,573,760 | 11/1996 | Thorne et al. ......................... 424/84 |
| 5,609,879 | 3/1997 | Myles ................................... 424/410 |
| 5,623,124 | 4/1997 | Chien .................................... 220/3.8 |
| 5,683,005 | 11/1997 | Mordick ............................... 220/3.8 |

OTHER PUBLICATIONS

Esenther et al.; "Attractant–Mirex Bait Suppresses Activity of Reticulitermes"; Journal of Economic Entomology, vol. 67, No. 1; Feb., 1974; pp. 85–88.

Esenther et al.; "Insecticidal Baits on Field Plot Perimeters Suppress Reticulitermes"; J. Econ. Entomol. 71 (4): 604–607 (Aug. 1978).

Ettershank et al.; "Location of Food Sources by Subterranean Termites"; Enviorn. Entomol. 9 (5): 645–648 (Oct. 1980).

Ewart; "Direct Colony Baiting of Termite Colonies: A Tool for Ecological Studies;" Proceeding of the Symposium on Current Research on Wood–Destroying Organisms and Future Prospects for Protecting Wood in Use, United States Department of Agriculture; May, 1991; pp. 38–42.

French et al.; "Baits for Aggregating Large Numbers of Subterranean Termites"; J. Aust. ent. Soc. 1981, 20: 75–76.

French et al.; "Baiting techniques for subterranean termite control"; The International Research Group on Wood Preservation, May, 1983, pp. 1–3.

French et al.; "A Technique Used on Mounds of *Coptotermes Lacteus* to Screen Potential Bait Substrates"; J. Aust. ent. Soc., 1985, 24: 111–112.

French; "Baiting Techniques for Control of Coptotermes Species Within Existing Buildings in Australia"; Proceedings of the Symposium on Current Research on Wood–Destroying Organisms and Future Prospects for Protecting Wood in Use, United States Department of Agriculture, May, 1991; pp. 46–50.

French; "How Do We Advise the Pest Control Industry in the Post–Organochlorine Era?"; Proceedings of the Symposium on Current Research on Wood–Destroying Organisms and Future Prospects for Protecting Wood in Use, United States Department of Agriculture, May, 1991; pp. 58–62.

Frishman et al., "Proper Chemical Dispersion Key to Termite Control"; Pest Control Technology, Apr., 1988, pp. 33–36.

Frishman et al.; "Rodding is a Tricky Business"; Pest Control, Aug. 1991, pp. 48–56.

Grace et al.; "Eastern Subterranean Termite (Isoptera: Rhinotermitidae) Foraging Territories And Populations In Toronto"; Can. Ent. 121: 551–556 (Jul. 1989).

Grace; "Behavioral Ecology of Subterranean Termites and Implications for Control"; Proceedings of the Symposium on Current Research on Wood–Destroying Organisms and Future Prospects for Protecting Wood in Use, United States Department of Agriculture, May, 1991; pp. 43–45.

Jones; "Evaluation of Two Insect Growth Regulators for the Bait–Block Method of Subterranean Termite (Isoptera: Rhinotermitidae) Control"; J. Econ. Entomol, 77 (5): 1086–1091 (Oct. 1984).

Jones; "Field evaluation of several bait toxicants for subterranean termite control: a preliminary report"; The International Research Group on Wood Preservation; Apr. 25, 1988; pp. 1–11.

Mauldin et al.; "Soil termiticides: A review of efficacy data from field tests"; The International Research Group on Wood Preservation; May 31, 1987; pp. 1–19.

Oloo; "Some Observations on the Trail–Laying Behaviour of *Macrotermes Michaelseni* (Sjost) (Termitidae)"; Insect Sci. Applic., vol. 5, No. 4, pp. 259–262, 1984.

Ostaff et al; "Termite (Isoptera) Suppression with Toxic Baits"; Can. Ent. 107: 1321–1325 (Dec. 1975).

Paton et al.; "Control of *Mastotermes darwiniensis* Froggatt (Isoptera: Mastotermitidae) with Mirex Baits"; Australian Forest Research 10: 249–258 (1980).

Spragg et al.; "Tracing, Trophallaxis and Population Measurement of Colonies of Subterranean Termites (Isoptera) Using a Radioactive Tracer"; Ann. Entomol. Soc. Am. 73 (6): 708–714 (Nov. 1980).

Su et al.; "Effects of a Dye, Sudan Red 7B, on the Formosan Subterranean Termite, *Coptotermes formosanus* Shiraki (Isoptera: Rhinotermitidae)"; Mate. und Org. 18: 127–133; 1983.

Su et al.; "Oral toxicity of a slow–acting insecticide Amdro® to the Formosan subterranean termite"; The International Research Group on Wood Preservation; May 10, 1982; pp. 1–5.

Su et al.; "Trials on the field control of the Formosan subterranean termite with Amdro® bait"; The International Research Group on Wood Preservation; May 10, 1982; pp. 1–10.

Su et al.; "Effect of Behavior on the Evaluation of Insecticides for Prevention of or Remedial Control of the Formosan Subterranean Termite"; J. Econ. Entomol.; vol. 75(2); Apr. 1982; pp. 188–193.

Su et al.; "A Dye, Sudan Red 7B, as a Marking Material for Foraging Studies with the Formosan Subterranean Termite"; Sociobiology, vol. 8 (No. 2) 1983; 91–97.

Su et al.; "Comparisons of Laboratory Methods for Estimating Wood Consumption Rates by *Coptotermes formosanus* (Isoptera: Rhinotermitidae)"; Annals of the Entomological Society of America, vol. 77, No. 2, Mar. 1984, pp. 125–129.

Su et al.; "Foraging Behavior of the Formosan Subterranean Termite (Isoptera: Rhinotermitidae)"; Environ. Entomol. 13 (6): 1466–1470 (Dec. 1984).

Su et al.; "Differences in survival and feeding activity among colonies of the Formosan subterranean termite (Isoptera, Rhinotermitidae)"; Z. ang. Ent. 97; 1984, pp. 134–139.

Su et al.; "Effects of Three Insect Growth Regulators, Feeding Substrates, and Colony Origin on Survival and Presoldier Production of the Formosan Subterranean Termite (Isoptera: Rhinotermitidae)"; Journal of Economic Entomology, vol. 78, No. 6, Dec. 1985; pp. 1259–1263.

Su et al.; "Wood–Consumption Rate and Survival of the Formosan Subterranean Termite (Isoptera: Rhinotermitidae) when Fed One of Six Woods Used Commercially in Hawaii"; Proceedings, Hawaiian Entomological Society, vol. 26, Mar. 1, 1986, pp. 109–114.

Su et al.; "Effects of Starvation on Survival and Maintenance of Soldier Proportion in Laboratory Groups of the Formosan Subterranean Termite, *Coptotermes formosanus* (Isoptera: Rhinotermitidae)"; Ann. Entomol. Soc. Am. 79 (2); 312–316 (Mar. 1986).

Su et al.; "Field Comparison of Sulfuryl Fluoride Susceptibility Among Three Termite Species (Isoptera: Kalotermitidae, Rhinotermitidae) During Structural Fumigation"; J. Econ. Entomol. 79 (4): 903–908 (Aug. 1986).

Su et al.; "A Method to Access, Trap, and Monitor Field Populations of the Formosan Subterranean Termite (Isoptera: Rhinotermitidae) in the Urban Environment"; Sociobiology vol. 12 (No. 2), 1986, pp. 299–304.

Su et al.; "Characterization of Slow–acting Insecticides for the Remedial Control of the Formosan Subterranean Termite (Isoptera: Rhinotermitidae)"; Forum: J. Econ. Entomol. 80 (1); pp. 1–4 (Feb. 1987).

Su et al.; "An Overview of the Formosan Subterranean Termite (Isoptera: Rhinotermitidae) in the World"; Proceedings of the International Symposium on the Formosan Subterranean Termite 67th Meeting of the Pacific Branch Entomological Society of America; Oct., 1987; pp. 3–15.

Su et al.; "Effects of Soldier Proportion on the Wood–Consumption Rate of the Formosan Subterranean Termite (Isoptera: Rhinotermitidae)"; Sociobiology vol. 13, No. 2., 1987, pp. 145–151.

Su et al.; "Alate Production of a Field Colony of the Formosan Subterranean Termite (Isoptera: Rhinotermitidae)"; Sociobiology vol. 13, No. 3, 1987; pp. 209–215.

Su et al.; "Initiation of Worker–Soldier Trophallaxis by the Formosan Subterranean Termite (Isoptera: Rhinotermitidae)"; Insectes Sociaux, Paris, 1987, vol. 34, No. 4, pp. 229–235.

Su et al.; "A Behavioral Assay for Measuring Feeding Deterrency of a Slow–acting Biocide, A–9248, Against the Formosan Subterranean Termite (Isoptera: Rhinotermitidae)"; The International Research Group on Wood Preservation; Mar. 7, 1988; pp. 1–7.

Su et al.; "Toxicity and Lethal Time of N–Ethyl Perfluorooctane Sulfonamide Against Two Subterranean Termite Species (Isoptera: Rhinotermitidae)"; The Florida Entomologist, vol. 71 (1); Mar., 1988; pp. 73–78.

Su et al.; "Toxicity and Feeding Deterrency of a Dihaloalkyl Arylsulfone Biocide, A–9248 Against the Formosan Subterranean Termite (Isoptera: Rhinotermitidae)"; J. Econ. Entomol. 81(3); 850–854 (Jun. 1988).

Su et al.; "The Formosan Subterranean Termite, Foraging Populations, Territories, and Competition with the Eastern Subterranean Termite in an Urban Habitat"; Pest Management, Jul. 1988; pp. 16–25.

Su et al.; "Retention Time and Toxicity of a Dye Marker, Sundan Red 7B, on Formosan and Eastern Subterranean Termites (Isoptera: Rhinotermitidae)"; J. Entomol. Sci. vol. 23, No. 3 (Jul. 1988) pp. 235–239.

Su et al.; "Intra– and Interspecific Competition of the Formosan and the Eastern Subterranean Termite: Evidence from Field Observations (Isoptera: Rhinotermitidae)"; Sociobiology vol. 14, No. 1, 1988, pp. 157–164.

Su et al.; "Foraging Population and Territory of the Formosan Subterranean Termite (Isoptera: Rhinotermitidae) in an Urban Environment"; Sociobiology vol. 14, No. 2, 1988, pp. 353–359.

Su et al.; "Concentration–Time Relationship for Fumigant Efficacy of Sulfuryl Fluoride Against the Formosan Subterranean Termite (Isoptera: Rhinotermitidae)"; J. Econ. Entomol. 82(1); 156–158 (Feb. 1989).

Su et al.; "Comparative Effects of an Insect Growth Regulator, S–31183, Against the Formosan Subterranean Termite and Eastern Subterranean Termite (Isoptera: Rhinotermitidae)"; J. Econ. Entomol. 82(4); 1125–1129 (Aug. 1989).

Su et al.; "Method to Monitor Initiation of Aerial Infestations by Alates of the Formosan Subterranean Termite (Isoptera: Rhinotermitidae) in High–Rise Buildings"; J. Econ. Entomol. 82(6); 1643–1645 (Dec. 1989).

Su et al.; "High–Rise Termites, Aerial Infestations of Formosan Subterranean Termite Alates"; Pest Management, Feb. 1990, pp. 22–24.

Mix; "A Look Into The Future"; Pest Control, Mar., 1990; pp. 50–54.

Su et al.; "Comparison of Eleven Soil Termiticides Against the Formosan Subterranean Termite and Eastern Subterranean Termite (Isoptera: Rhinotermitidae)"; J. Econ. Entomol. 83 (5); Oct. 1990; pp. 1918–1924.

Su et al.; "Economically Important Termites in the United States and Their Control"; Sociobiology, vol. 17, No. 1, 1990; pp. 77–94.

Su et al.; "Potential of Insect Growth Regulators as Termiticides: A Review"; Sociobiology, vol. 17, No. 2, 1990; pp. 313–328.

Su et al.; "Laboratory Evaluation of Two Slow–Acting Toxicants Against Formosan and Eastern Subterranean Termites (Isoptera: Rhinotermitidae)"; J. Econ Entomol. 84 (1) Feb. 1991; pp. 170–175.

Su et al.; "Remedial Wood Preservative Efficacy of BORA–CARE™ Against the Formosan Subterranean Termite and Eastern Subterranean Termite (Isoptera: Rhinotermitidae)"; The International Research Group on Wood Preservation; Apr. 2, 1991; pp. 1–8.

Su et al.; "Laboratory Evaluation of Disodium Octaborate Tetrahydrate (TIM–BOR') as a Wood Preservative or a Bait–Toxicant Against the Formosan and Eastern Subterranean Termites (Isoptera: Rhinotermitidae)"; The International Research Group on Wood Preservation; Apr. 24, 1991; pp. 1–12.

Su et al.; "Population Suppression of Subterranean Termites by Slow–Acting Toxicants"; Proceedings of the Symposium on Current Research on Wood–Destroying Organisms and Future Prospects for Protecting Wood in Use, U.S. Dept. of Agriculture; May, 1991; pp. 51–57.

Su et al.; "Uniform Size Particle Barrier: A Physical Exclusive Device Against Subterranean Termites (Isoptera: Rhinotermitidae)"; Journal of Economic Entomology, vol. 84, No. 3, Jun., 1991; pp. 912–916.

Su et al.; "Suppression of Foraging Populations of the Formosan Subterranean Termite (Isoptera: Rhinotermitidae) by Field Applications of a Slow–acting Toxicant Bait"; Journal of Economic Entomology, vol. 84, No. 5; Oct., 1991; pp. 1525–1531.

Su; "Evaluation of Bait–Toxicants for Suppression of Subterranean Termite Populations"; Sociobiology, vol. 19, No. 1, 1991 pp. 211–220.

Su et al.; "Evaluation of Twelve Dye Markers for Population Studies of the Eastern and Formosan Subterranean Termite (Isoptera: Rhinotermitidae)"; Sociobiology, vol. 19, No. 2, 1991; pp. 349–362.

Su et al.; "Agonistic Behavior Among Colonies of the Formosan Subterranean Termite, *Coptotermes formosanus* Shiraki (Isoptera: Rhinotermitidae), from Florida and Hawaii: Lack of Correlation with Cuticular Hydrocarbon Composition"; Journal of Insect Behavior, vol. 4, No. 1, 1991, pp. 115–128.

Su et al; "Recent Advances in Termite Biology and Control"; Proceedings of the National Conference on Urban Entomology, 1992; pp. 93–101.

Su; "Basic Research Keys Development of New Termite Control Bait"; Pest Control, Jun. 1993, 61:38–48.

Shaheen; "Fascinating Behavior Keeps Su Mystified"; Pest Control, Jun. 1993.

Su; "Baits, Are They in the Future of Termite Control? At Least One Prominent Termite Researcher Thinks So"; Pest Control Technology, Jul., 1993.

Su et al.; "A Shallow Sub–surface Monitoring Station for Subterranean Termites (Isoptera);" Sociobiology, vol. 23, No. 2, 1993; pp. 175–182.

Su; "Field Evaluation of a Hexaflumuron Bait for Population Suppression of Subterranean Termites (Isoptera: Rhinotermitidae)"; Journal of Economic Entomology, vol. 87, No. 2, Apr. 1994; pp. 389–397.

Su et al.; "Estimating Oral Toxicity of Slow–Acting Toxicants Against Subterranean Termites (Isoptera: Rhinotermitidae)"; Journal of Economic Entomology, vol. 87, No. 2 Apr. 1994; pp. 398–401.

Tamashiro et al.; "A Simple Method to Observe, Trap, and Prepare Large Numbers of Subterranean Termites for Laboratory and Field Experiments"; Environmental Entomology, vol. 2., No. 4, pp. 721–722, Aug. 1973.

Verkerk; *Building Out Termites;* "Curative Termite Management in Existing Buildings"; 1990; pp. 133–138.

Gao, D., B. Zhu, B. Gan, S. He, and S. Yuan. 1985. "A new toxic bait for the control of forest–infesting termites". J. Nanjing Inst. Forest. 3: 128–131 (in Chinese with English summary).

Grace, J.K. 1990. "Mark–recapture studies with *Reticulitermes flavipes* (Isoptera: Rhinotermitidae)". Sociobiol. (in press as of Jun. 1990).

Su, N.–Y. 1982. "An Ethological approach to the remedial control of the Formosan subterranean termite, *Coptotermes formosanus* Shiraki". Ph.D. diss. Univ. of Hawaii. Honolulu, Hawaii.. 124pp.

Su., N.–Y., and R.H. Scheffrahn. 1986. "The Formosan subterranean termite, *Coptotermes Formosanus* (Isoptera: Rhinotermitidae) in the United States": 1907–1985, pp. 31–38. In: P. A. Zungoli [ed.], Proc. Nat'l. Conference Urban Entomol. Univ. Maryland, College Park, MD.

Su, N.–Y. and R. Scheffrahan. 1987. "Current status of the Formosan Subterranean Termite in Florida", pp. 32–37. In: M. Tamashiro and N.–Y. Su [eds.], Biology and control of the Formosan subterranean termite. Collect of Trop. Agr. Human Resources, Univ. of Hawaii, Honolulu, HI.

La Fage, et al., Environmental Entomology, (1973) 2(5): 954–56, "Desert Subterranean Termites: A Method for Studying Foraging Behavior."

Esenther, et al., Sociobiology, (1979) 4(2): 215–22, "Termite Control: Decayed Wood Bait."

Beal et al., Sociobiology, (1980), "A new approach to subterranean termite control–the bait block method." 5(2): 171–4.

Gonzales, J. Philipp. Ent. 4(6): 543–47, 1981, "Urban Pest control in the Philippines".

French et al., Sociobiology (1981) 6(2):135–51 "A rapid and Selective Field Assessment of Termite Wood Feeding Preference on the Subterranean Termite H. Ferro using Toilet roll and small wood block baits".

Ferrar, P. Oecologia 52:139–46 (1982) "Termites of South African Savanna III Comparative Attach on Toilet Roll Baits in Subhabitats".

Ali, AM et al., *Assiut Journal of Agricultural Sciences,* (1982) "Surface Activity of Termite in the New Valley", v. 13, No. 3, p. 73.

Degroot, USDA workshop on termiticides in building protection Sep. 2223, 1982. "Alternatives to termiticides in building protection."

Badawi, et al., Zeitschrift fur angewandte Entomologie, (1984) Population studies of some species of termites in Al–Kharj Oasis, Central Region of Saudi Arabia:, pp. 253–261.

Thompson, C. Florida Entomologist 68 (4): 641–5 Dec. 1985, "Bait Stake detection of the Formosan termite in south Florida".

French et al., Sociobiology 11(3): 303–309 (1986) "Mound Colonies of *C. lacteus* Eat Cork in preference to sound wood".

Abushama, et al., *Journal of Arid Environments,* (1988), "The foraging activity of subterranean termites in the Kuwait Desert", v. 14, pp. 75–82.

Epsky, et al., Ent. Soc. of Amer. (1988), "Efficacy of the Entomogenous Nematode etc.", 81 (5): 1313–17.

Duncan., Protection News bulletin of the Plant Protection Research Inst., Pretoria, ZA, Mar. 1988, "Research into baits for harvester termite control".

Grace, Pan–Pacific Entomologist 65(4), 1989 381–384, "A Modified Trap Technique for Monitoring R. Subterranean Termite Populations".

Grace, Paper for the 21st annual meeting May 14–18, 1990 in NZ, International Research Group on Wood Preservation, "Termites in Eastern Canada: An Updated Review and Bibliography".

Grace, paper for 21st annual meeting May 14–18, 1990 NZ; "Preliminary Evaluation of Borate Baits and Dusts for Eastern Subterranean Termite Control".

Logan et al., Bull. of Ent. Research 1990 80:19–26 "Lab Trials on the toxicity of hydramethylnon to *R. santonensis* etc." authors from Overseas Devlopment Natural Resources Inst., in UK and Faculty University Pertanian in Malaysia.

Miller, CSIRO, in Australia, publication (no date but 1990 or later based on reference cited): "Fluorescent Dyes as Markers in Studies of Foraging Biology of Termite Colonies".

Ewart et al., Sociobiology 20(1):17–22 (1992) "Hollow Stakes for Detecting Subterranean Termites (Isoptera: Rhinotermitidae)".

Begon M. [1979] *"Investigating animal abundance: capture–recapture for biologies",* University Park Press, Baltimore, MD.

La Faga, J.P., N.–Y. Su, M. J. Jones and G. R. Esenther. 1983. A rapid method for collecting large numbers of subterranean termites from wood. Sociobiology 7: 305–309.

Scheffrahn, R. H., and N.–Y. Su. 1987. Structure/activity relationships of 2–haloalkanoic acids and their esters as antitermitic agents against the Formosan subterranean termite (Isoptera: Rhinotermitidae). J. Econ. Entomol. 80: 312–316.

Haverty, M. I., N.–Y. Su, M. Tamashiro, and R. Yamamoto. 1989. Concentration–dependent presoldier induction and feeding deterrency: potential of two insect growth regulators for remedial control of the Formosan subterranean termite (Isoptera: Rhinotermitidae). J. Econo. Entomol. 82: 1730–1374.

Grace, Forest Products Journal 42 (2): 66–65 1992, "Resistance of borate–treated Douglas fir to the Fomosan subterranean termite".

Esenther, "Estimating the Size of Subterranean Termite Colonies By a Release–Recapture Technique," The International Research Group on Wood Preservation; Feb. 29, 1980; pp. 1–5.

Lai, P.Y. 1977. Biology and Ecology of the Formosan Subterranean Termite, *Coptotermes formosanus,* and its Suspectiblity to the Entomogenous Fungi, *Beauveria bassiana* and *Metarrhizium anisopliae.* Ph.D. Dissertation, University of Hawaii.

Su, N.–Y., P.M. Ban, and R.H. Scheffrahn. 1993. Foraging populations and territories of the eastern subterranean termite (Isoptera: Rhinotermitidae) in southeastern Florida. Environ. Entomol. 2: 1113–1117.

Su N.–Y., E.M. Thoms, P.M. Ban, and R.H. Scheffrahn. 1995. A monitoring/baiting station to detect and eliminate foraging populations of subterranean termites (Isoptera: Rhinotermitidae) near structures. J. Econ. Entomol. 88 (4): 932–936 (Aug. 1995).

Su, N.–Y. 1991. Termites of the United States and their control. SP World, 17: 12–15.

Su N.–Y. 1993. Methodologies for termiticide testing and standardization. The Int'l. Res. Group on Wood Preservation. Document No. IRG/WP/993–10043. pp. 1–5.

Su, N.–Y. 1994. The termite bait age dawns. Pest Control. 62: 36–38.

Su, N.–Y., and R.H. Scheffrahn. 1990. Update of the Formosan subterranean termite. pp. 41–45. Proc. Nat'l. Conference on Urban Entomology. Clemson, S.C.

Su, N.–Y. 1993. Managing subterranean termite populations. In: Wildey, K.B. and W.H. Robinson, [eds.], pp. 45–50. Proc. of the 1st Int'l. Conf. on Insect Pests in the Urban Environment.

METHODS AND APPARATUS FOR PEST MONITORING OR CONTROL

CROSS-REFERENCE TO RELATED APPLICATION

This application claims the benefit of U.S. Provisional Application No. 60/016,422, filed Apr. 29, 1996.

BACKGROUND OF THE INVENTION

1. Field of the Invention

This invention relates generally to methods and apparatus for monitoring or controlling pests, and more particularly to the monitor or control of harmful social insects which live in colonies and are capable of communication through chemical signals, such as insects of the order Isoptera, and more specifically, termites.

2. Description of the Prior Art

There are presently available a number of methods and apparatus that may be utilized for monitor or control of harmful social insects. In general, such methods and apparatus are directed to controlling pests once they have been detected as a result of a monitoring procedure. After detection, the pests are controlled by inducing the pests to ingest or otherwise come into contact with a toxicant in a matrix which is attractive to pests, particularly pests from a specific nest or colony.

Subterranean termites typically dwell in soil and often form large colonies. Members of the colony forage for food and burrow galleries or passageways in the soil outwardly from the colony nest, and portions of food located by foraging termites are returned to the nest. Termites communicate the location of a food source to other termites within the colony by chemical signals such as pheromones. These characteristics may be exploited in the field of the present invention to effectively control pest infestations. In the course of traveling to the nest, an insect may leave highly specific trail pheromones which direct or recruit other insects to a food source. Subsequently, other insects, usually from the same colony, detect the chemical signal and are thus directed to that food source. The concentration and composition of these pheromones can be species and colony specific, and trail pheromones may be very different from feeding-initiating pheromones. Insects can leave feeding-initiating pheromones in a food source itself, communicating the desirability of the food. Deposit of specific pheromones in a toxicant-containing matrix food source by foraging insects aids in recruiting other nestmates to the toxicant-containing matrix, whereupon they forage, are exposed to toxicant, and deposit more pheromone, thus creating a cyclical control method. Toxicants to be delivered to insect populations are preferably slow-acting, lethal at concentrations which do not repel target insects, and capable of being combined with an insect food. Insects directly contacting or ingesting the toxicant will not be killed immediately, but will travel to their colony to recruit other nestmates to the toxicant, thereby resulting in the control of large numbers of colony members due to interactions with the colony before death occurs.

In providing methods and apparatus for monitoring of and delivery of toxicant to pests, it is advantageous to minimize disruption to a site where pests have begun feeding. Where such a site is located in the soil, site disruption is minimized, for instance, as described in PCT international publication 93/05004 and U.S. Pat. No. 5,329,726, by using a station housing which is permanently fixed into the soil and capable of being periodically refilled with replacement monitoring and toxicant-containing matrices.

Despite the availability of such methods and devices, there exists a need in the art for methods and apparatus for pest monitoring or control that are capable of use in above-ground applications where placement of an apparatus within a hole would be impractical, such as where pests are present in structures, trees, and the like, and which provides a stable, minimally disrupted site where it is possible to have the replenishment of toxicant-containing matrix with the ability to restrict exposure to such matrix by pest control personnel.

SUMMARY OF THE INVENTION

In order to aid in the understanding of the present invention, it can be stated in essentially summary form that it is directed to methods and apparatus for monitor or control of pests where pest consumption of a matrix may be periodically monitored and supplemented while maintaining a stable feeding environment for the pests. The methods and apparatus can be used for in-ground and above-ground interior and exterior settings such as structures, including homes, and in trees, on or near fences and the like, and most preferably, are used in above-ground settings. The methods and apparatus are particularly useful in part because they are capable of monitoring and/or controlling pests while providing minimal disruption to a site where pests have begun feeding.

More specifically, the invention relates in one of its aspects to a connectable device for use in monitoring or controlling pests wherein the device comprises a primary housing, a connecting means and a mounting means. The primary housing comprises an exterior surface and defines an interior chamber and a plurality of orifices disposed between the exterior surface and the chamber. The connecting means is for connecting the primary housing to a secondary housing such that at least one of the orifices of the primary housing is at least partially aligned with an orifice defined by the secondary housing so that the chamber of the primary housing communicates with an interior chamber defined by the secondary housing. The mounting means is used for mounting the exterior surface of the primary housing to a mounting surface of a structure proximate to the pests to be monitored or controlled so that at least one of the orifices of the primary housing is disposed adjacent to the mounting surface to provide a pathway between the chamber of the primary housing and the structure. A pest-edible matrix can be provided inside the chamber for monitoring or controlling pests.

In another of its aspects, the invention relates to an apparatus for monitoring or controlling pests comprising a plurality of housings, connecting means, mounting means and at least one cover. The cover is used to essentially cover any of the housing orifices not in direct communication with other orifices of other housings or disposed adjacent to the mounting surface.

In another of its aspects, a primary housing and at least one secondary housing are provided, each housing having a first exterior surface and a second exterior surface and defining an interior chamber. A first orifice is disposed between the first exterior surface and the interior chamber, and a second orifice is disposed between the second exterior surface and the interior chamber. The connecting means can connect each of the secondary housings to at least one other of the housings such that the first exterior surface of each of the secondary housings contacts the second exterior surface of another of the housings. Thus, the first orifice of each of the secondary housings is in communication with the second orifice of another of the housings so that the interior chambers of connected housings are in communication with each other. The second orifice of one of the secondary housings of the apparatus is not in direct communication with any of the first orifices of the other housings. A cover is provided for covering the non-communicating second orifice.

The invention also contemplates an apparatus for monitoring or controlling pests comprising flexible first, second and third sheets. The first sheet defines an orifice disposed therethrough and has a detachable flap disposed to cover the orifice, a generally planar interior surface, and an opposing generally planar exterior surface. The second sheet defines a view port disposed therethrough and has a detachable, movable viewing flap capable of movement to cover and uncover the view port, a generally planar lower surface, and an opposing generally planar upper surface. The third sheet has a generally planar inside surface and an opposing generally planar outside surface. Means are provided for attaching the interior surface to the lower surface at a first path at least partially surrounding the orifice and the view port, thereby defining a volume between the first and second sheets. Means are also provided for demountably attaching the inside surface to the upper surface at a second path at least partially surrounding the view port and for detachably mounting the exterior surface to a mounting surface proximate to the pests along a third path surrounding the orifice.

In another of its aspects, the invention relates to an apparatus for monitoring or controlling pests comprising a plurality of housings and mounting means for mounting the exterior surface of each of the housings to a mounting surface proximate to the pests in side-by-side arrangement so that the interior chambers of the housings are in communication with the mounting surface through the first orifice and in communication with each other through the second orifice.

The invention further relates to several methods for using apparatus and devices similar to the above apparatus and devices for monitoring or controlling pests.

It is an object of the present invention to provide methods and apparatus for pest monitoring or control that are highly effective in monitoring pest colonies and/or controlling large pest colonies with the use of only very small amounts of toxicant.

It is another object of the present invention to provide methods and apparatus for pest monitoring or control whereby toxicant is applied in a strictly defined and controlled manner to minimize exposure to the environment by confining the toxicant to very limited quantities, coverage domain, and time periods.

It is yet another object of the present invention to provide methods and apparatus for pest monitoring or control that are environmentally responsible yet contemplate a minimal number of simple components and steps.

It is yet another object of the present invention to provide apparatus and methods for pest monitoring or control wherein the apparatus may be easily and safely serviced while minimizing risk of exposure to persons handling toxicants.

It is yet another object of the present invention to provide apparatus and methods for pest monitoring or control that maximize toxicant intake by pests while significantly reducing the amount of toxicant used.

Further objects and advantages of the present invention will be apparent from a study of the following portion of the specification, the claims, and the attached drawings.

DESCRIPTION OF THE PREFERRED EMBODIMENTS

The following portion of the specification, taken in conjunction with the drawings, sets forth the preferred embodiments of the present invention. The embodiments of the invention disclosed herein are the best modes contemplated by the inventors for carrying out the invention in a commercial environment, although it should be understood that various modifications can be accomplished within the parameters of the present invention.

Figure 1:
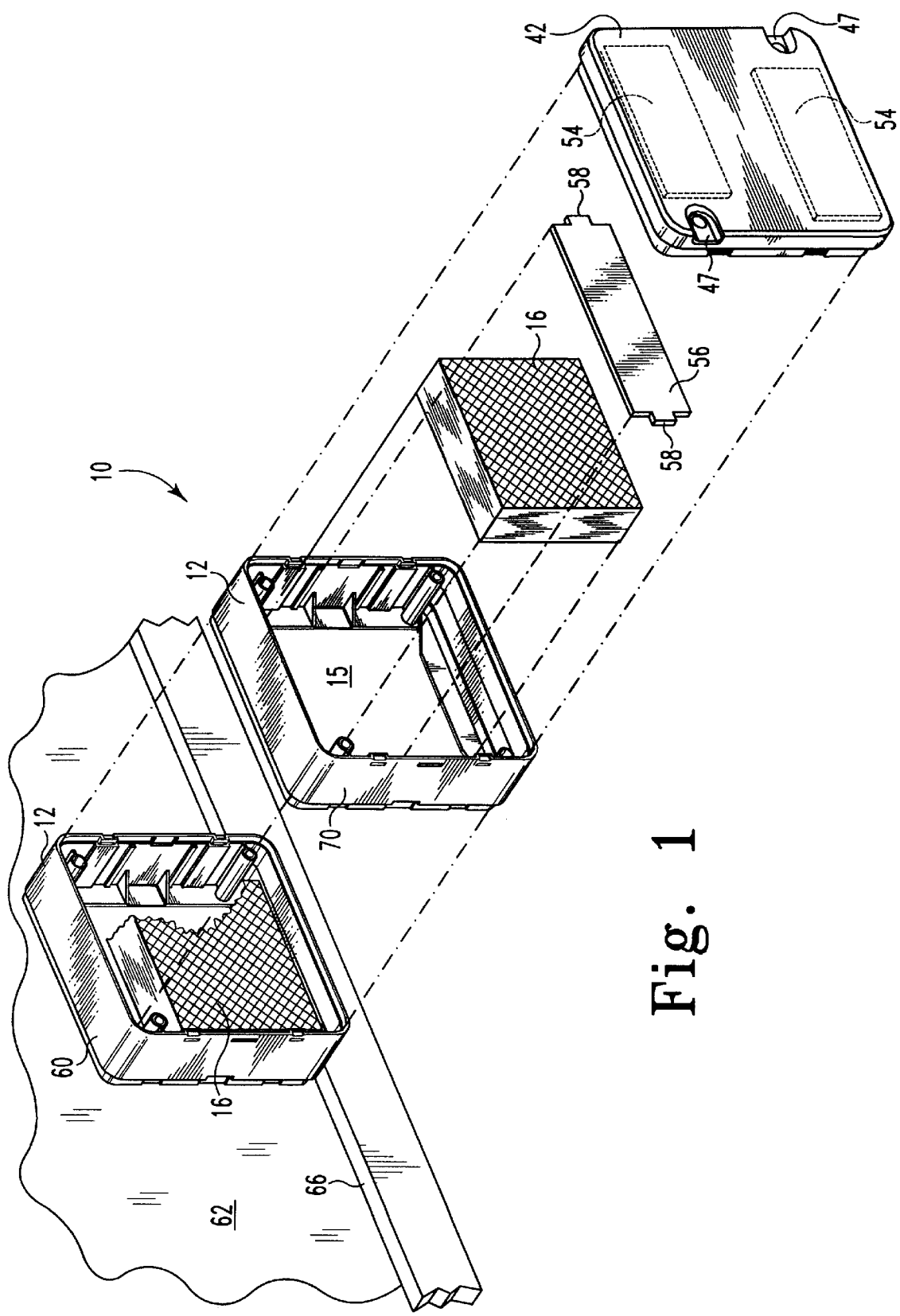
FIG. 1 is an exploded perspective view of a first embodiment of an apparatus for pest monitoring or control representing the present invention.
Figure 2:
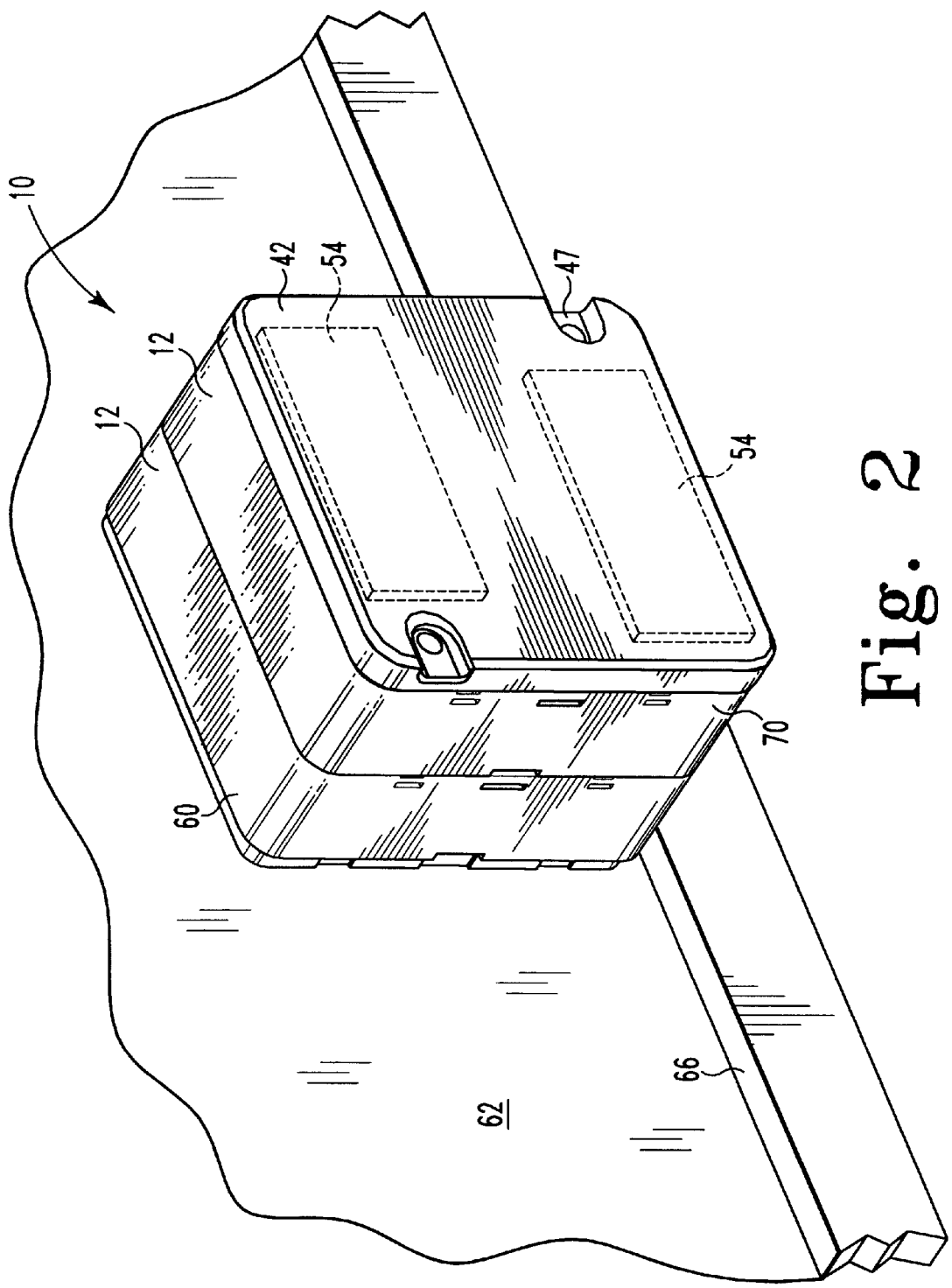
FIG. 2 is a perspective view of the first embodiment of an apparatus for pest monitoring or control representing the present invention.
Figure 3:
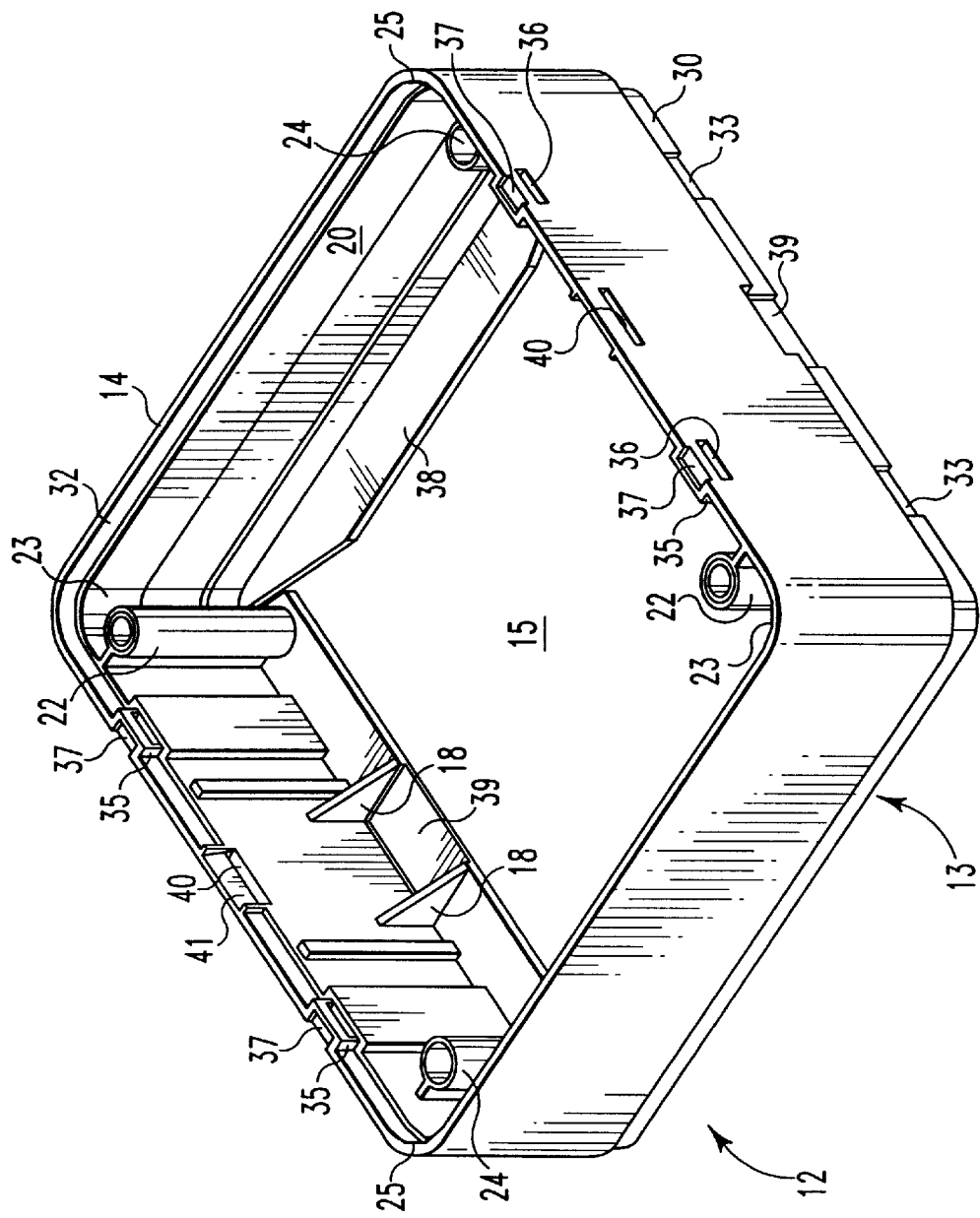
FIG. 3 is an enlarged perspective view of a housing of the first embodiment of an apparatus for pest monitoring or control representing the present invention.
Figure 6:
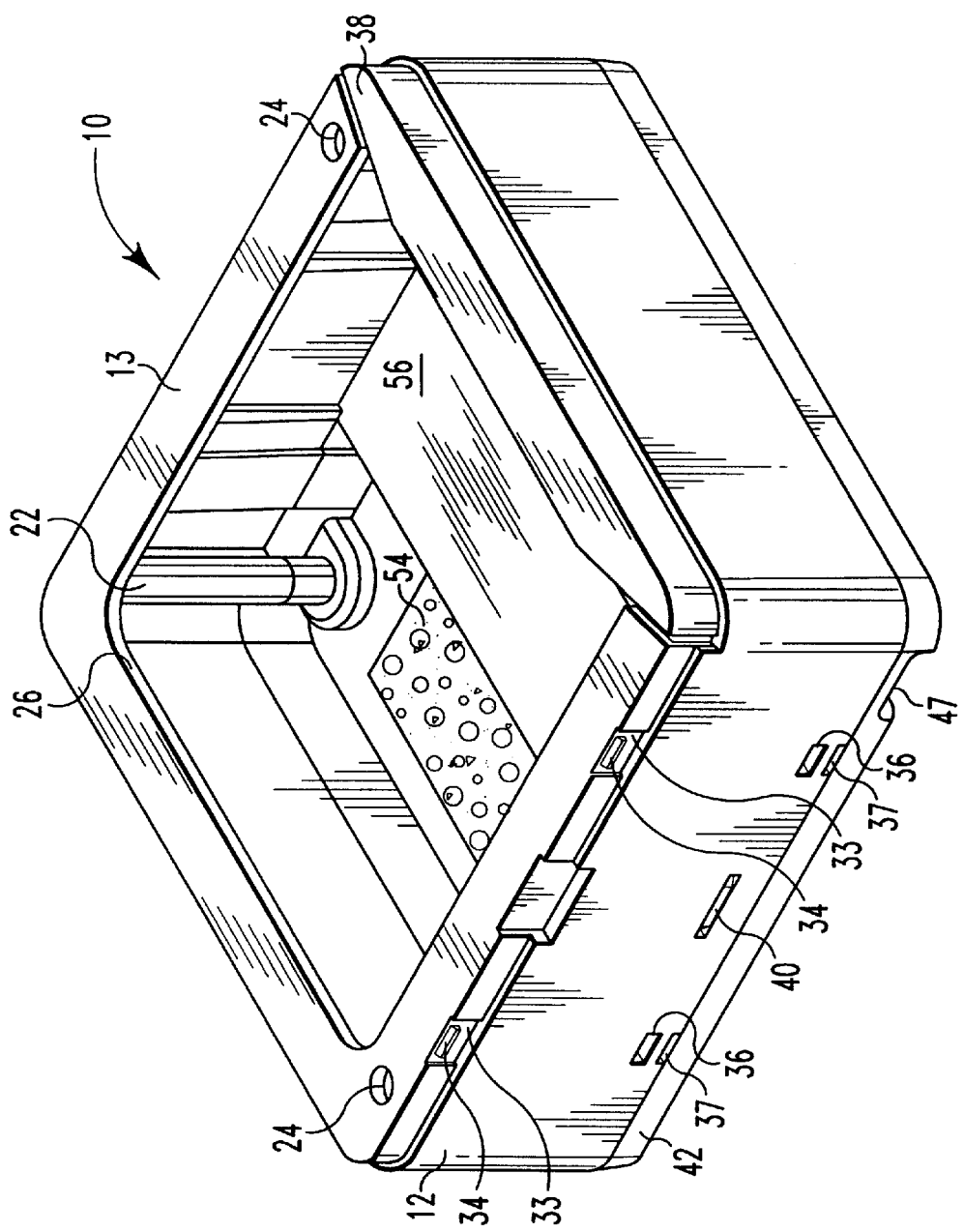
FIG. 6 is an enlarged bottom perspective view of the first embodiment of an apparatus for pest monitoring or control representing the present invention, shown without a matrix.

Referring now to the drawings for a detailed description of a first embodiment of the present invention, reference is first made to FIGS. 1–8 depicting apparatus 10 including a plurality of housings 12, each preferably formed of a durable material which is preferably resilient, essentially non-biodegradable, and temperature and ultraviolet radiation degradation resistant, such as any of various well-known polymers, including polystyrene, as well as non-corrosive metals and wax. Referring to FIGS. 3 and 6, each housing 12 includes generally planar first exterior surface 13, opposing, generally planar second exterior surface 14, and defines interior chamber 15 capable of containing at least one pest-edible matrix 16 within surrounding inner surface 20 partially defining interior chamber 15.

A suitable matrix is any matrix suitable for the pest species being monitored or controlled and is preferably formable from fibrous or modified fibrous substances, e.g., cellulose-containing materials. Suitable cellulose-containing materials include, but are not limited to, paper, paper products (either 100% virgin paper, recycled paper, or a combination of virgin paper and recycled paper), cotton linter, cardboard, paperboard, wood particles or wood flour, recycled paper or cellulose ethers such as methylcellulose, hydroxypropylmethylcellulose, and hydroxybutylmethylcellulose, commercially available under the tradename of Methocel® (trademark of The Dow Chemical Company), or other agricultural fibers. These materials can be bleached, typically with one or more solutions, e.g., aqueous solutions, of bleaching chemicals. Paper products and cotton linter can optionally be textured or roughened and can also optionally comprise a plurality of laminated plies.

For use with termites and other pest species which are attracted to, or reliant on, the presence of sufficient moisture, water can be added to the matrix and the matrix can further comprise a humectant or other moisture adjusting means for maintaining the moisture content within the interior chamber typically at a preselected level. Pheromone mimics and other components making the matrix attractive or non-repellent to the pest species being monitored or controlled can also be provided.

The matrix may also include a toxicant, preferably one which is slow acting, which can be impregnated or incorporated into the matrix. Alternatively, should monitoring of suspected insect activity without insect control be desired, the matrix may be utilized without toxicant. Suitable toxicants are for example, chemical insecticides, insect growth regulators, microbial pathogens or toxins derived therefrom such as those described in PCT international publications WO 93/23998 and WO 93/24011. Preferred chemical insecticides are those described in PCT international publication WO 93/24011, particularly preferred are those insecticidal compounds referred to in the claims of PCT international publication WO 93/24011, and more preferably hexaflumuron. Compounds which are structurally similar to hexaflumuron as disclosed in U.S. Pat. No. 5,556,883, or other acyl urea compounds as disclosed in U.S. Pat. No. 4,833,158, e.g., flufenoxuron, may also be utilized. Other suitable toxicants may include certain benzoylphenylurea compounds like those disclosed in U.S. application Ser. No. 08/745,387, filed Nov. 8, 1996, and U.S. Provisional Application Ser. Nos. 60/029,742, 60/029,747, and 60/029,748, all filed Nov. 8, 1996, and the toxicants disclosed in PCT international publication WO 96/32009. U.S. Pat. No. 5,556,883, U.S. application Ser. No. 08/745,387 and U.S. Provisional Application Ser. Nos. 60/029,742, 60/029,747, and 60/029,748 are all incorporated by reference herein for their teachings of various pesticide compounds which could be used as the toxicant in connection with the present invention.

Self-tapping stanchions 22 are attached to inner surface 20 proximate to opposing first corners 23, and bored stanchions 24 are similarly attached to inner surface 20 proximate to opposing second corners 25. Each housing 12 defines housing first orifice 26 disposed between first exterior surface 13 and interior chamber 15, and housing second orifice 28 (see FIG. 4) disposed between second exterior surface 14 and interior chamber 15. Each housing 12 includes a connecting means for connecting it to a second housing such that orifice 28 of the first housing is at least partially aligned with orifice 26 defined by the second housing (i.e., the two orifices are in communication with each other) so that interior chamber 15 of the first housing communicates with interior chamber 15 defined by the second housing. As shown in FIG. 3, proximate to first exterior surface 13, each housing 12 further includes perimeter shoulder 30, and proximate to second exterior surface 14, each housing includes perimeter step 32, whereby first exterior surface 13 of each housing 12 is capable of mating engagement with second exterior surface 14 of another housing 12. Disposed at each perimeter shoulder 30 are a plurality of channels 33, with each channel 33 including a barbed, outwardly projecting, latching finger 34 (see FIG. 5) which is adapted to function as a one way snap mechanism. Positioned at each step 32 is a plurality of inwardly projecting notches 35 disposed to correspond with channels 33 of another housing 12. Each notch 35 includes slot 36, so that a housing 12 may be attached to another housing 12 by snapping each finger 34 into one corresponding slot 36 as first exterior surface 13 of housing 12 is positioned in mating engagement with second exterior surface 14 of the other housing 12. Each housing 12 may be removably and interchangeably connected to other housings 12 by relative flexure of fingers 34 with respect to slots 36 and disposing each finger 34 into one slot 36. Detachment of housings 12 so positioned in mating engagement may be effectuated by use of a bladed instrument, such as a screwdriver, into one of pry grooves 37 defined in each housing 12 proximate to second exterior surface 14. In addition, each of housings 12 may be removably and interchangeably connected to other housings 12 using any of a variety of connecting means rather than the previously described fingers and slots.

Figure 4:
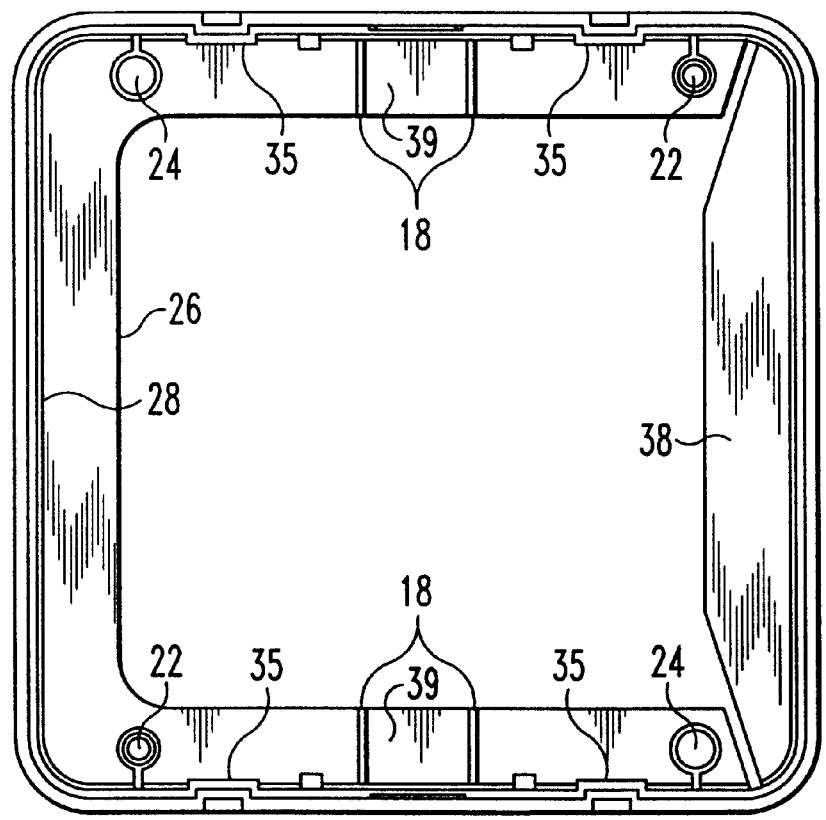
FIG. 4 is an enlarged top plan view of the housing of the first embodiment of an apparatus for pest monitoring or control representing the present invention.
Figure 5:
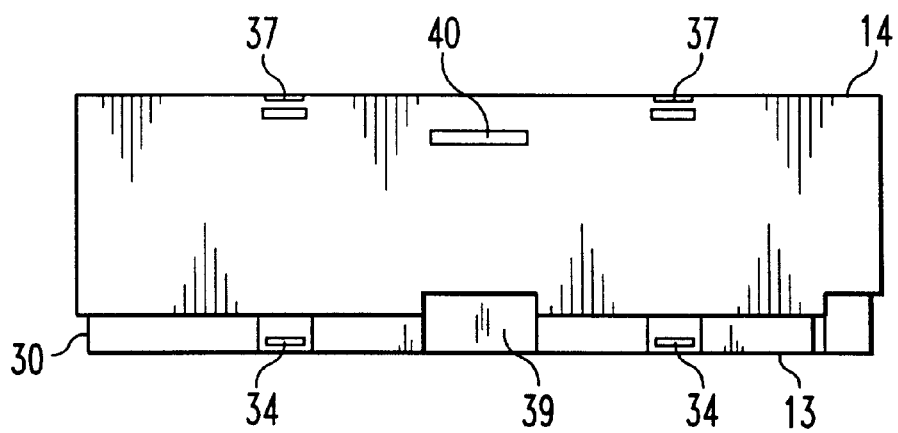
FIG. 5 is an enlarged side view of the housing of the first embodiment of an apparatus for pest monitoring or control representing the present invention.

Referring to FIG. 4, the configuration of housing first orifice 26 may be modified, typically enlarged to a preselected size, by removing one or more frangible breakout portions, including large breakout portion 38 and opposing small breakout portions 39 disposed between interior uprights 18. Of course, it will be recognized that the breakout portions illustrated in FIG. 4 are exemplary only, and that additional breakout portions may be disposed at numerous locations in housing 12. Referring to FIG. 3, opposing matrix holding plate notches 40 are also defined by each housing 12 proximate to second exterior surface 14, and disposed adjacent to each matrix holding plate notch 40 is flexible matrix holding plate retaining finger 41.

Figure 7:
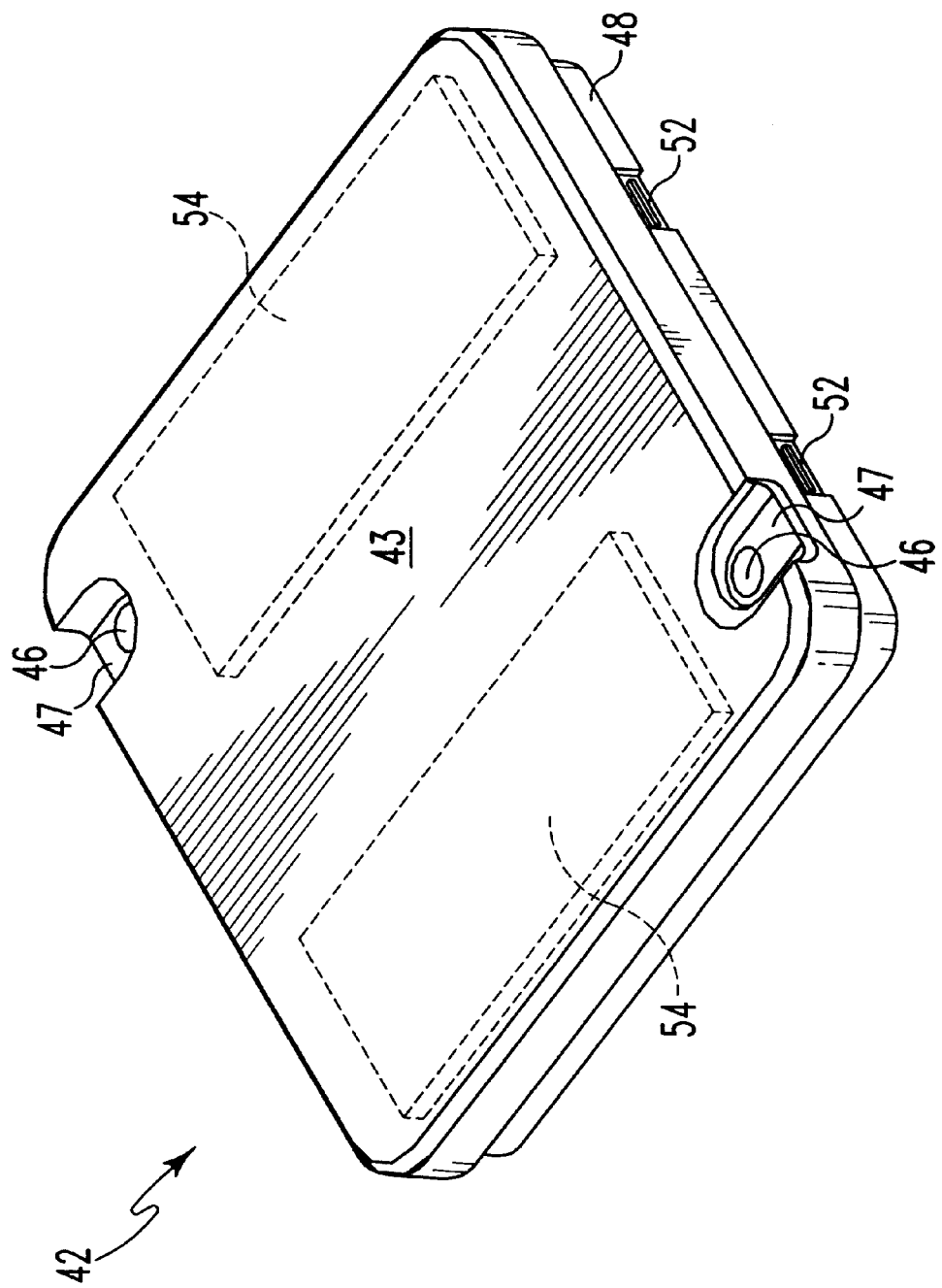
FIG. 7 is an enlarged perspective view of a cover of the first embodiment of an apparatus for pest monitoring or control representing the present invention.
Figure 8:
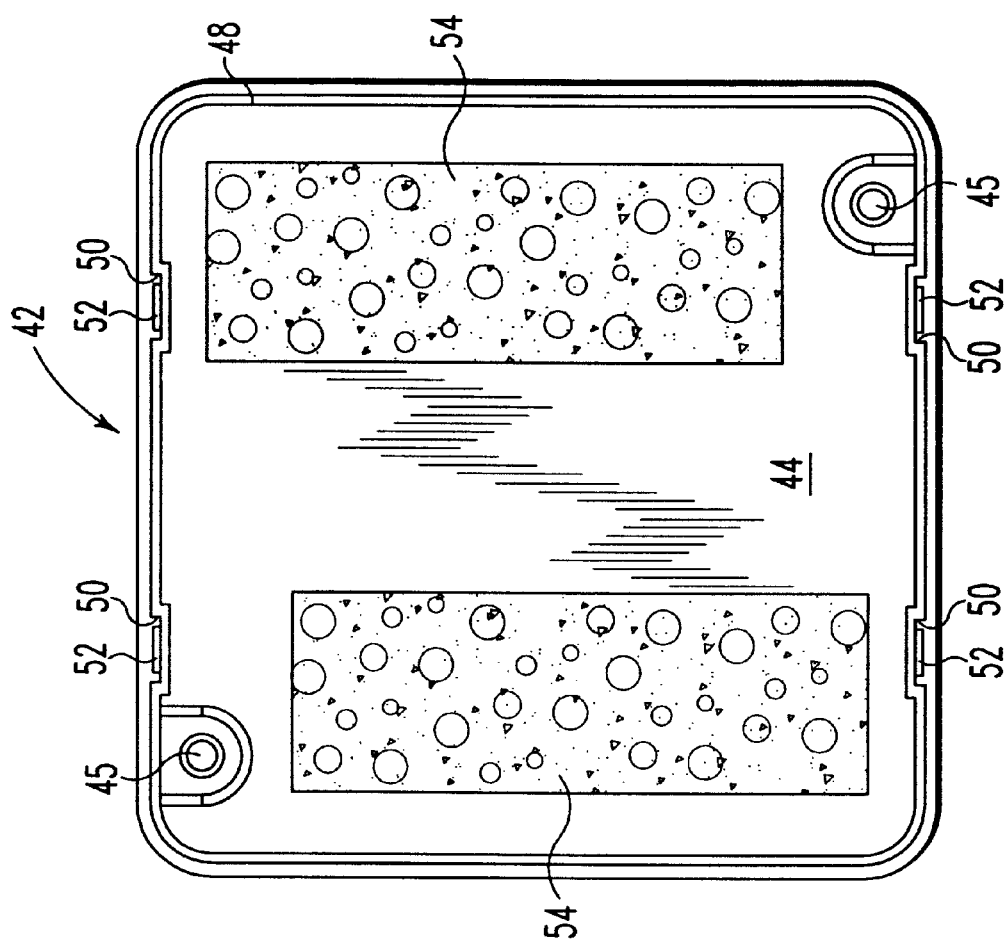
FIG. 8 is an enlarged bottom plan view of the cover of the first embodiment of an apparatus for pest monitoring or control representing the present invention.

As illustrated in FIGS. 7 and 8, cover 42 includes generally planar cover outside surface 43, cover inside surface 44, and a pair of cover stanchions 45 disposed adjacent to cover inside surface 44 proximate to diagonally opposite corners of cover 42. Cover 42 is preferably formed of a durable material which is preferably resilient, essentially non-biodegradable, and resistant to temperature and ultraviolet radiation degradation, such as any of various well-known polymers, non-corrosive metals and wax. Each cover stanchion 45 defines cover bore 46, and cover outside surface 43 defines a pair of countersunk portions 47 corresponding with cover bores 46. Cover bores 46 are disposed for alignment with self-tapping stanchions 22 of housing 12 when cover 42 is mounted to housing 12, as will be described. Cover 42 further includes cover perimeter shoulder 48, and disposed at cover shoulder 48 is a plurality of cover channels 50, with each cover channel 50 including a smooth, outwardly projecting latching finger 52. Consequently, cover 42 is capable of mating engagement with second exterior surface 14 of housing 12 by snapping each latching finger 52 into one corresponding slot 36 of housing 12. Once engaged with housing 12, cover 42 essentially covers or conceals housing second orifice 28 (see FIG. 4) of housing 12. Cover 42 positioned in mating engagement with housing 12 may be detached using a bladed instrument within pry grooves 37. Cover 42 may be removably and interchangeably connected to any housing 12 by relative flexure of latching fingers 52 with respect to slots 36 and disposing each latching finger 52 in one slot 36. Further, cover 42 may be removably connected to housing 12 using any of a variety of connecting means rather than the previously described latching fingers 52 and slots 36. For instance, as previously noted, cover bores 46 are disposed for alignment with self-tapping stanchions 22, so that when cover 42 is engaged with housing 12, further attachment of cover 42 to housing 12 may be accomplished by using a threaded fastener, such as a self-tapping screw, not shown, disposed through each cover bore 46 and threadably engaged in each self-tapping stanchion 22. Preferably mounted to cover inside surface 44 are one or more moisture units 54 to adjust moisture content within the present invention. Moisture units 54 may be formed of any suitable moisture retaining material, for example, an absorbent, sponge-like material, and mounted to cover 42 for instance, by adhesive. Moisture units 54 may in some instances be used to adjust moisture content within interior chamber 15 to a preselected level.

Referring to FIGS. 1 and 6, generally planar matrix holding plate 56, having tabs 58, may be removably mounted to housing 12 by snapping each tab 58 into one matrix holding plate notch 40, with matrix holding plate 56 maintained in place by matrix holding plate retaining fingers 41 (see FIG. 3). Alternatively, matrix holding plate 56 may be disposed in permanent attachment to housing 12, for instance, by permanently attaching tabs 58 within matrix holding plate notches 40, by integrally forming matrix holding plate 56 with housing 12, or by otherwise suitably attaching matrix holding plate 56 to housing 12 utilizing any of a variety of fasteners, adhesives, or the like. Matrix holding plate 56 serves to operably hold matrix 16 in place in interior chamber 15, and may also display instructions, notices, and other pertinent information to users upon removal of cover 42 from housing 12.

Referring to FIG. 1, housing 12, referred to as primary housing 60, may be mounted to mounting surface 62 proximate to a location of known insect activity in such a manner that first exterior surface 13 (see FIG. 6) of housing 12 is mounted to mounting surface 62. Interior chamber 15 will then be in communication with mounting surface 62 through housing first orifice 26 (see FIG. 6) which is disposed adjacent to mounting surface 62 to provide a pathway between interior chamber 15 and mounting surface 62. Mounting surface 62 may be located indoors or outdoors, may be the surface of a structure, such as a home, or a tree, fence, or similar, and is appropriately selected and prepared for intervention by creating a pathway for the insects to gain access to mounting surface 62. Mounting of primary housing 60 to mounting surface 62 may be accomplished, for instance by disposing a fastener, not shown, through each bored stanchion 24 (see FIG. 3) and into mounting surface 62. The fasteners may be selected from presently available fasteners including screws, nails, pins and the like. In addition, primary housing 60 may be mounted to mounting surface 62 by other means, including magnetic means, adhesives, caulk, and tapes. For monitoring or control of insects or pests, matrix 16, containing an insect toxicant, if desired, is disposed within interior chamber 15 of primary housing 60, as described, and moisture may be added to moisture units 54 and cover 42 is snapped into mating engagement with primary housing 60 at second exterior surface 14 (see FIG. 3). Also, matrix 16 may in some instances be provided without toxicant, whereby monitoring of suspected insect activity in an above-ground setting may be accomplished prior to use of toxicant to control insects.

Cover 42 may, in addition, be removably secured to primary housing 60 by use of threaded fasteners through cover bores 46 (see FIG. 7) and into self-tapping stanchions 22 (see FIG. 3), thereby lessening the chance of unauthorized or accidental removal of cover 42. Cover 42 is used to essentially or substantially cover housing second orifice 28 (see FIG. 4) which is not in direct communication with (i.e., not immediately adjacent to) any other orifices of other housings or disposed adjacent to mounting surface 62 of the structure. Primary housing 60 and cover 42 thus maintain matrix 16 in an environment within interior chamber 15 that preferably has relatively restricted air movement so as to minimally disturb foraging insects or pests, and which, when it is desired, is substantially light-free and controls moisture evaporation. Housing 12 and cover 42 isolate matrix 16 from the environment, preventing exposure to toxicants by persons encountering the present invention, as matrix 16 cannot be accessed from any external opening of housing 12 or cover 42, and also serve to prevent moisture loss while enclosing matrix 16 of variously presented shapes and sizes. As is apparent from the above description, cover 42 is movable between a first position covering housing second orifice 28 and a second position wherein housing second orifice 28 is not covered.

In the event that mounting surface 62 is non-planar and defines an edge through which insect access to the present invention is to occur, one or more different-sized breakout portions may be provided in primary housing 60, so, for example, as shown in FIGS. 1 and 2, where mounting surface 62 includes edge 66 through which insect access to the present invention is to occur, large breakout portion 38 (see FIG. 3) may be removed from primary housing 60 prior to mounting to mounting surface 62, and primary housing 60 mounted so that the edge of housing 12 which formerly comprised the large breakout portion 38 is disposed in engagement with edge 66. Also, one or more additional breakout portions may be provided in housing 12, such as small breakout portions 39 (see FIG. 3) which may be removed from primary housing 60 prior to mounting to mounting surface 62. Small breakout portions 39 are particularly advantageous where insect access to the present invention is desired through an orifice smaller than that provided by large breakout portion 38, for instance, when the present invention is to be disposed in engagement with elevated pest tunnels.

Insect consumption of matrix 16 may be monitored by viewing through cover 42 where cover 42 is transparent or translucent, or by removing cover 42 from primary housing 60 when an essentially light-free environment is being maintained to reveal matrix 16 through housing second orifice 28 (see FIG. 4), while maintaining primary housing 60 in place with respect to mounting surface 62. In the event that a substantial portion of toxicant-containing matrix 16 has been consumed, as illustrated in FIG. 1 by matrix 16 present in primary housing 60, additional toxicant may be delivered to the insects by mounting another housing 12, referred to as secondary housing 70, to primary housing 60 by snapping fingers 34 of secondary housing 70 into slots 36 of primary housing 60. Secondary housing 70 is typically substantially similar to and interchangeable with primary housing 60. Secondary housing 70 is thus positioned in mating engagement with primary housing 60, with first exterior surface 13 of secondary housing 70 disposed adjacent to second exterior surface 14 of primary housing 60, and housing first orifice 26 of secondary housing 70 being at least partially aligned with and communicating with housing second orifice 28 of primary housing 60. Consequently, insects present in interior chamber 15 defined by primary housing 60 may freely move into interior chamber 15 of secondary housing 70 and begin to consume matrix 16 therein because the interior chambers of primary housing 60 and secondary housing 70 are in communication with each other. By attachment of cover 42 to secondary housing 70 in the manner previously described with respect to attachment to primary housing 60, the present invention may be constituted in an extended, stacked form, providing additional matrix 16 in an environment where the interface between mounting surface 62 and primary housing 60 has remained largely undisturbed, whereby insects may move from matrix 16 of primary housing 60 to matrix 16 of secondary housing 70 with minimal disruption to their feeding environment.

Clearly, after a substantial portion of matrix 16 of secondary housing 70 has been consumed, as may be revealed from periodic monitoring of activity in secondary housing 70, yet another housing 12 may be added by mounting to secondary housing 70 in a manner similar to that previously described with respect to mounting of secondary housing 70 to primary housing 60. Further additional housings 12 may be similarly added, thereby forming an extended stack of housings 12 attached to primary housing 60. Addition of housings 12 does not disturb the pre-existing network of access galleries or passageways previously established between the termite colony or nest and primary housing 60.

A stack of housings 12 mounted to primary housing 60 may be disassembled and reassembled with the relative position of individual housings 12 within the stack being thereby interchangeable, or with the removal of selected housings 12 in which matrix 16 has been substantially consumed. Also, placement of a new, unused housing 12 between a housing 12 having current insect activity and primary housing 60 may induce the insects to eat through matrix 16 of the new housing 12 to return to primary housing 60.

It will be recognized that although removal of primary housing 60 from mounting surface 62 may in some instances be appropriate, in general, primary housing 60 will be left in place, attached to mounting surface 62, in order to provide insects with a familiar and stable interface between the environment inside or on mounting surface 62 and inside housings 12 and primary housing 60.

In the event that matrix holding plate 56 is removably mounted to housing 12 and after all or a portion of matrix 16 in housing 12 has been consumed, if desired, a new, replacement matrix 16 may be disposed in housing 12 by removing matrix holding plate 56 from housing 12, placing the new, replacement matrix 16 within interior chamber 15 after removal of any remaining portion of original matrix 16, and thereafter replacing matrix holding plate 56 by inserting each tab 58 of matrix holding plate 56 into matrix holding plate notches 40.

Figure 9:
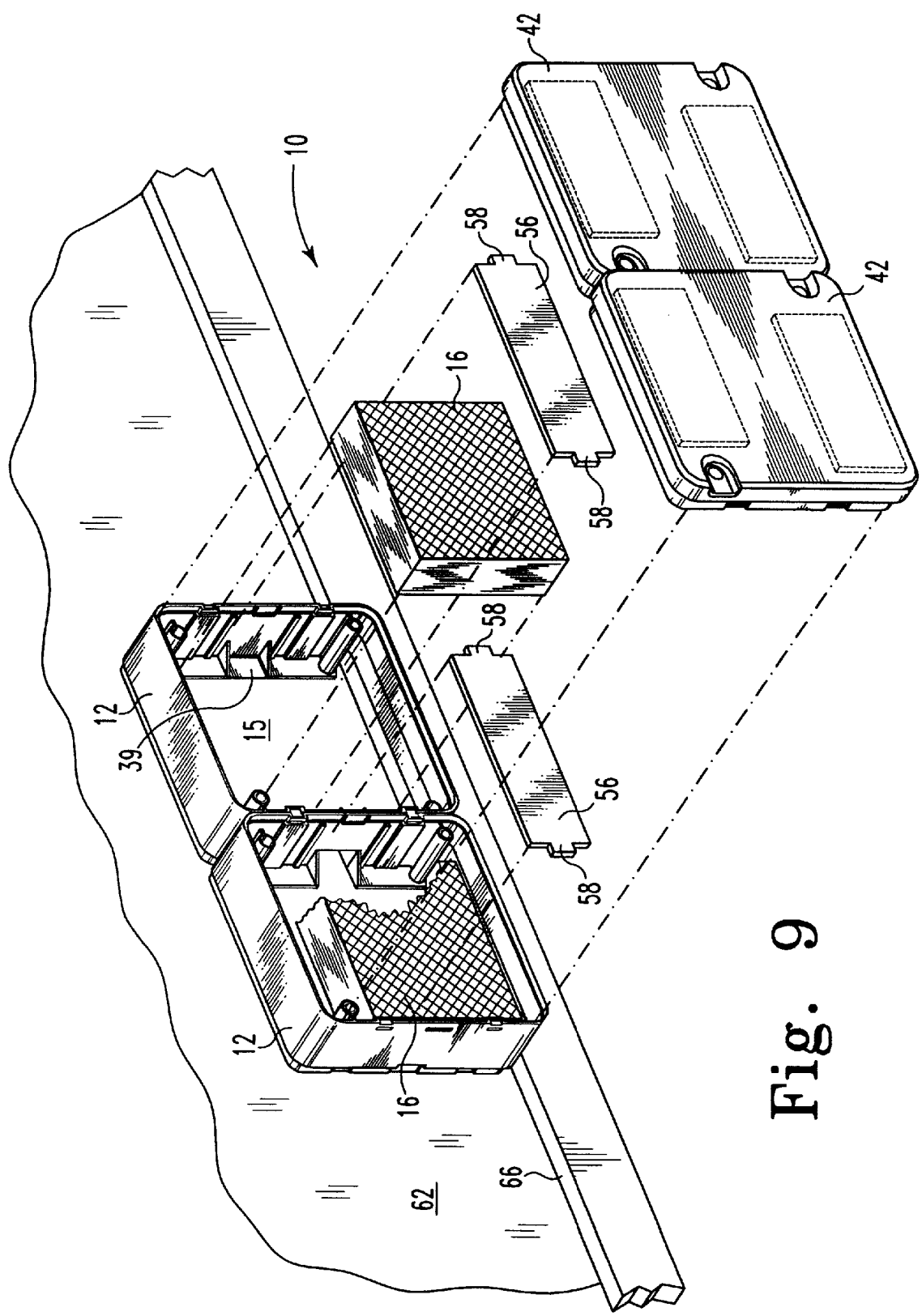
FIG. 9 is an exploded perspective view of a second embodiment of an apparatus for pest monitoring or control representing the present invention.
Figure 10:
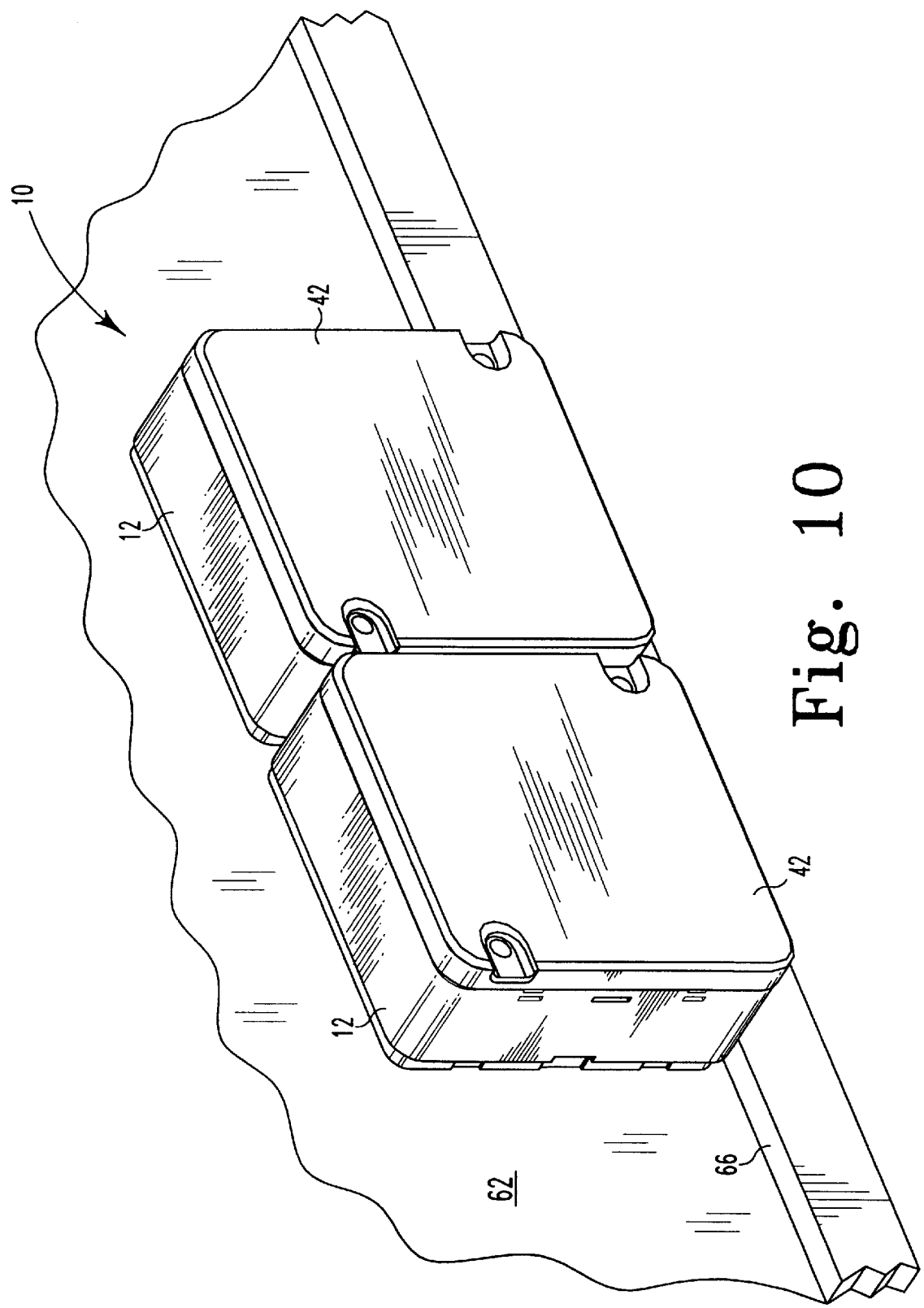
FIG. 10 is a perspective view of the second embodiment of an apparatus for pest monitoring or control representing the present invention.

In a second embodiment of the present invention, two or more housings 12 are arranged in side-by-side arrangement, for example, as depicted in FIGS. 9–10, showing a pair of housings 12 and a pair of covers 42 removably attached in side-by-side fashion to mounting surface 62. Mounting surface 62 has been appropriately selected and prepared for intervention by creating a pair of pathways for the insects to gain access to mounting surface 62 proximate to each housing 12, with each interior chamber 15 communicating through a respective housing first orifice 26 (see FIG. 6) with an insect pathway at mounting surface 62. Small breakout portions 39 are removed from adjacent sides of each housing 12 thereby permitting communication directly between housings 12. Matrix 16 is disposed within interior chamber 15 of each housing 12. As noted, mounting of housing 12 to mounting surface 62 may be accomplished by disposing a fastener through each bored stanchion 24 (see FIG. 3) and into mounting surface 62, or by other means including magnetic means, adhesives, caulk and tapes. Moisture may be added to moisture units 54, and each cover 42 snapped into mating engagement with one housing 12. As described, covers 42 may also be secured to housings 12 by use of threaded fasteners through cover bores 46 (see FIG. 7) and into self-tapping stanchions 22 (see FIG. 3). When monitoring indicates that a substantial portion of matrix 16 in a housing 12 has been consumed, one of the pair of housings 12 may be removed from mounting surface 62, and a new, replacement housing 12 substituted therefor. Prior to attachment to mounting surface 62, a corresponding small breakout portion 39 of a new replacement housing 12 can be removed, so that upon attachment to mounting surface 62, a new replacement housing 12 communicates with remaining original housing 12 through the openings in the housings 12 formed by removing the small breakout portions 39. In this way, insects feeding in remaining original housing 12 may freely move into a new replacement housing 12 to consume additional matrix 16. Subsequently, when insect feeding in a new replacement housing 12 has been established, remaining original housing 12 may be replaced with another housing 12 while a new replacement housing continues in place with respect to mounting surface 62. It will be apparent that alternative replacement of a housing 12 of the pair of housings 12 may thereafter continue indefinitely, with a high degree of insect environmental continuity achieved by replacing only one of side-by-side housings 12 at any given time. It will be recognized of course that, where more than two housings 12 are employed in a side-by-side array, replacement of one or more selected housings 12 may occur such that at least one housing 12 where insects are feeding does not have to be replaced during each replacement operation.

Figure 11:
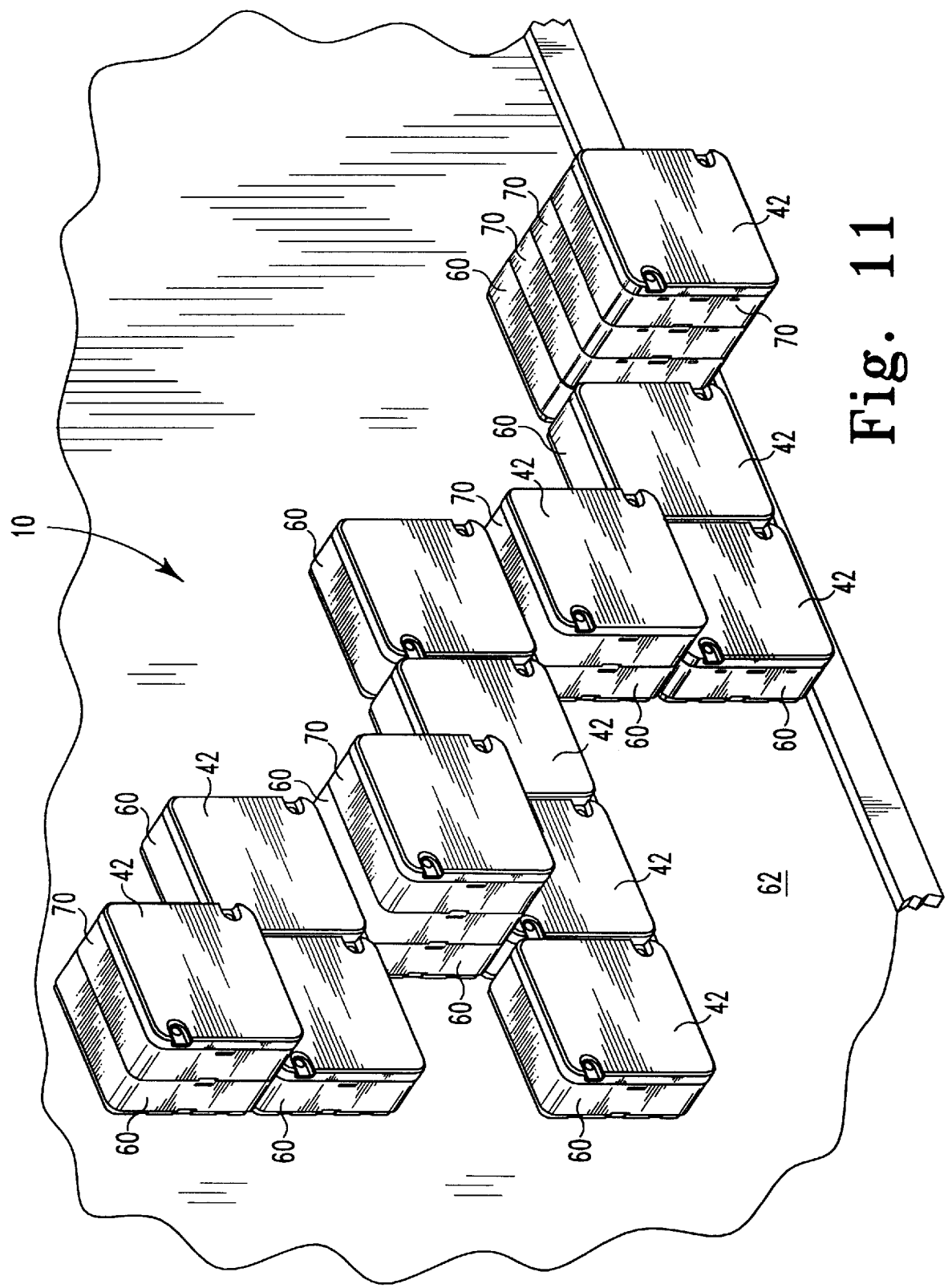
FIG. 11 is a perspective view of the first and second embodiments of an apparatus for pest monitoring or control representing the present invention.

First and second embodiments of the present invention may be used concurrently, as depicted in FIG. 11, where a plurality of housings 60 is attached to mounting surface 62, with each housing 60 communicating with at least one other housing 60 through a breakout portion, and those housings 60 communicating with more than one other housing 60 utilizing more than one appropriately located breakout portion. In addition, each housing 60 may have one or more secondary housings 70 attached thereto. Of course, the array of housings 60 and secondary housings 70 illustrated in FIG. 11 is arbitrary and exemplary only, with each housing 60 capable of communication with other housings 60 on each side thereof through appropriately located breakout portions and with any number of secondary housings 70.

Further, it will be recognized that primary housings 60 and secondary housings 70 may, in the alternative, be disposed in permanent attachment to each other in certain circumstances. In this regard, first exterior surface 13 of one secondary housing 70 may be fixed in stacked mating engagement with second exterior surface 14 of one of the primary housings 60 or another secondary housing 70, and/or a small breakout portion 39 of one housing 60 may be removed and the opening in the housing 60 formed thereby placed adjacent to the opening in another housing 60 formed in the same manner (removal of its small breakout portion 39) when housings 60 are permanently mounted in a side-by-side configuration.

Figure 12:
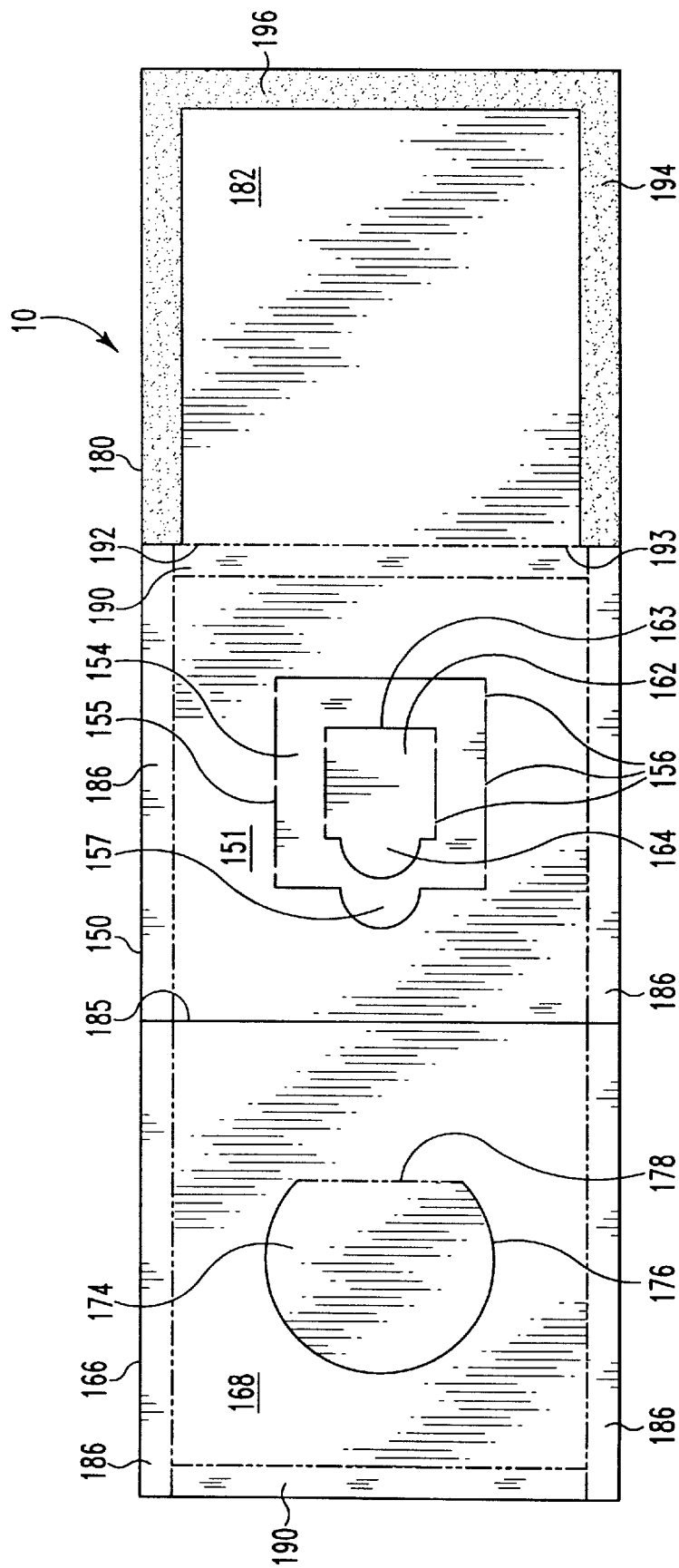
FIG. 12 is a top plan view of sheet portions of a third embodiment of an apparatus for pest monitoring or control representing the present invention.
Figure 13:
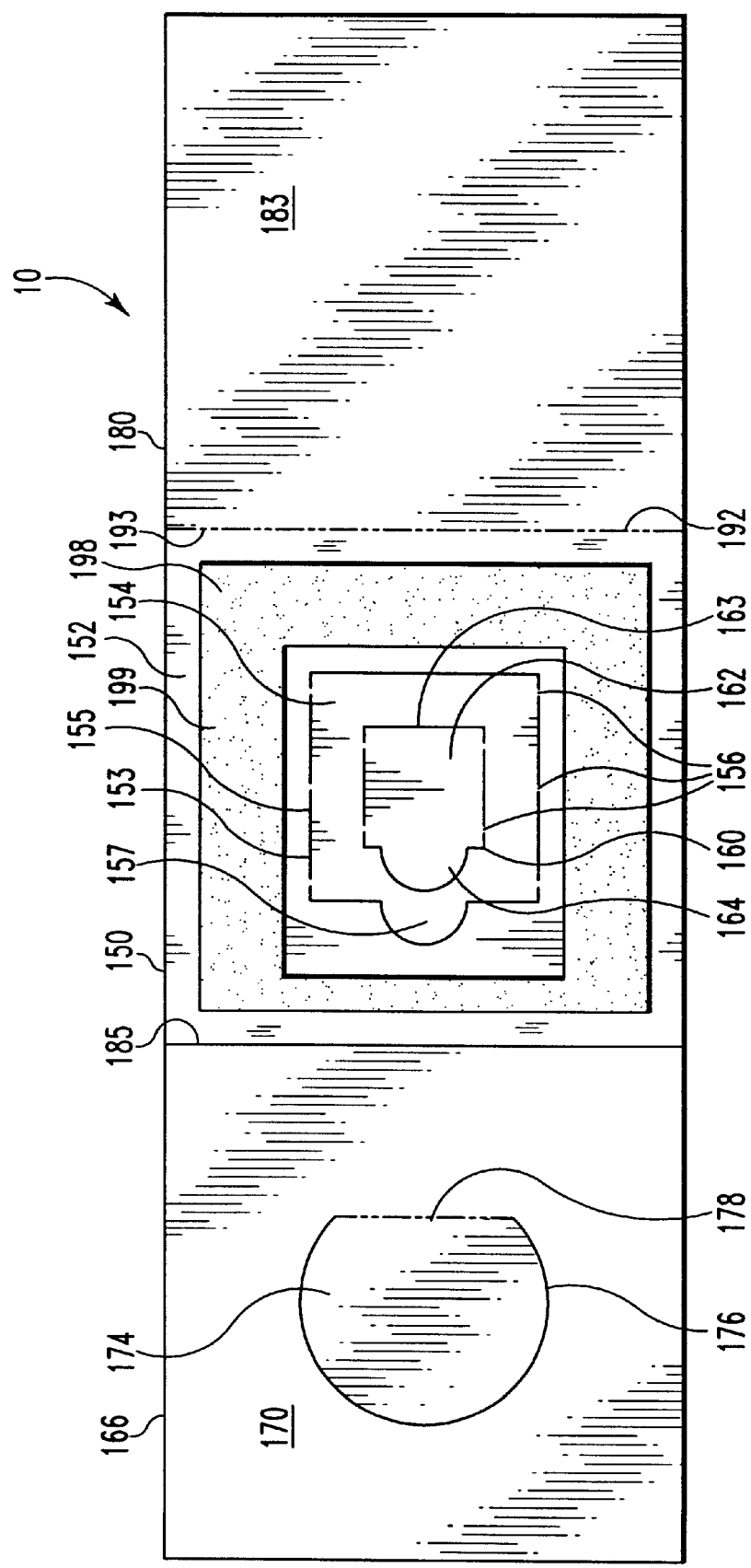
FIG. 13 is a bottom plan view of the sheet portions of the third embodiment of an apparatus for pest monitoring or control representing the present invention.

In a third embodiment of the present invention, and as depicted in FIGS. 12–16, apparatus 10 includes a plurality of thin, flexible first sheets 150, each having generally planar sheet interior surface 151 (see FIG. 12) and opposing generally planar sheet exterior surface 152 (see FIG. 13), defining sheet first orifice 153 (see FIG. 13) disposed through first sheet 150, and including flap 154 disposed to cover sheet first orifice 153. Flap 154 may be integrally formed with and attached to first sheet 150 by cutting first slits 155 through first sheet 150 to simultaneously form flap 154 and sheet first orifice 153. As shown in FIGS. 12–13, first slits 155 do not form a continuous perimeter of flap 154 due to the presence of connecting fingers 156, which serve to attach flap 154 to first sheet 150 at sheet first orifice 153. As will be described, flap 154 may be detached from first sheet 150 by grasping tab 157, pulling flap 154 to tear connecting fingers 156, thereby exposing sheet first orifice 153. Alternatively, with reference to FIG. 13, a releasable adhesive cover, not shown, may be disposed at sheet exterior surface 152, covering sheet first orifice 153 instead of flap 154, so that sheet first orifice 153 may be exposed by removing the releasable adhesive cover.

Figure 15:
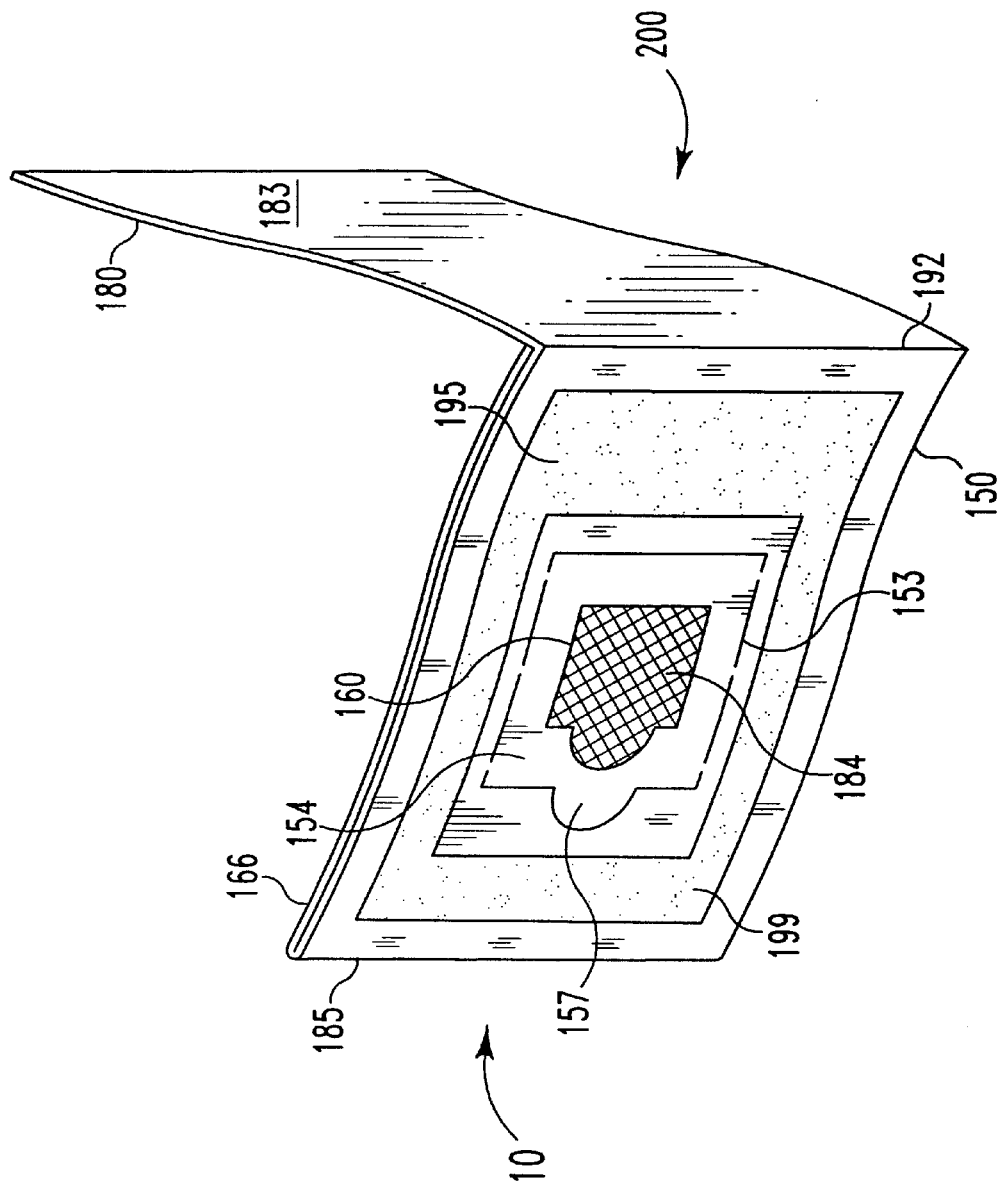
FIG. 15 is a bottom perspective view of the third embodiment of an apparatus for pest monitoring or control representing the present invention.
Figure 16:
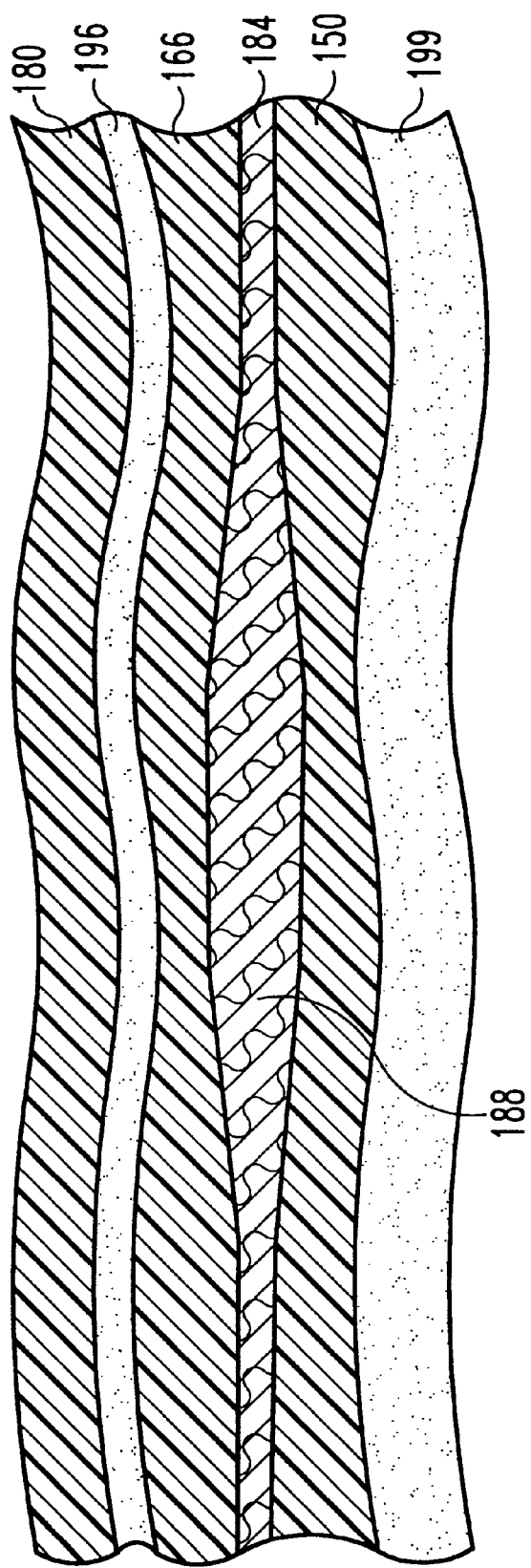
FIG. 16 is a detailed sectional view taken along line 16—16 of FIG. 14, but with the third sheet of the apparatus disposed in attachment to the second sheet of the apparatus.

Although not essential to the present invention, each flap 154 may additionally define, as depicted in FIGS. 13 and 15, sheet second orifice 160 disposed through flap 154 and include second flap 162 disposed to cover sheet second orifice 160. Sheet second orifice 160 thus defined is smaller in area than sheet first orifice 153. Second flap 162 may be integrally formed with and attached to flap 154 by cutting second slits 163 through flap 154 to simultaneously form second flap 162 and sheet second orifice 160. In a manner similar to that previously described with respect to first slits 155, second slits 163 do not form a continuous perimeter of second flap 162 due to the presence of connecting fingers 156, which attach second flap 162 to flap 154 at sheet second orifice 160. Further, second flap 162 may be detached from flap 154 by grasping second tab 164, pulling second flap 162 to tear connecting fingers 156, thereby exposing sheet second orifice 160.

Also as illustrated in FIGS. 12–16, apparatus 10 includes a plurality of thin, flexible second sheets 166, each having generally planar lower surface 168 (see FIG. 12), and opposing generally planar upper surface 170 (see FIG. 13), defining view port 172 (see FIG. 14) disposed through second sheet 166, and including viewing flap 174 disposed to cover view port 172. Viewing flap 174 may be integrally formed with and attached to second sheet 166 by cutting arched slit 176 through second sheet 166 to simultaneously form viewing flap 174 and view port 172. As shown in FIGS. 12–13, arched slit 176 does not form a continuous perimeter of viewing flap 174 due to the presence of perforated edge 178, which serves to bendably attach viewing flap 174 to second sheet 166 at view port 172. As will be described, viewing flap 174 is capable of opening and closing movement with respect to view port 172 by bending at perforated edge 178, and is also capable of detachment from second sheet 166 by grasping viewing flap 174 to tear along perforated edge 178, thereby exposing view port 172. Additionally, FIGS. 12–16 depict a plurality of thin, flexible third sheets 180, each having generally planar inside surface 182 (see FIG. 12), and opposing generally planar outside surface 183 (see FIG. 13).

First, second and third sheets 150, 166, and 180 may be integrally formed from a single piece of a thin, flexible, generally planar material, such as a polymeric sheet that is optionally metallized or stretchable. First, second and third sheets 150, 166, and 180 may be formed of transparent or translucent materials to simplify inspection, or may be opaque to provide an essentially light-free environment for preferably thin, flexible matrix 184 (see FIGS. 14–16) as will be described. Although not critical to the present invention, other than the materials being ones which are essentially resistant to insect attack, first, second and third sheets 150, 166, and 180 are preferably formed of a durable material which is essentially non-biodegradable and resistant to temperature and ultraviolet radiation degradation.

Thin, flexible matrix 184 is provided and may be selected to be any pest-edible matrix that is suitable for use associated with the monitoring, reduction or elimination of the pest species being monitored, and is flexible to provide the capability to conform in an advantageous manner as the third embodiment of the present invention is attached to a non-planar surface. As used herein with respect to descriptions of a matrix, the term "flexible" will be deemed to include a matrix formed as one or more continuous physical structures that have a relatively high degree of flexibility, such as a paper sheet-like structure, and will also include a matrix formed from an aggregated group or collection of independent particulate structures, such as wood particles, wood flour, or the like, with the members of such aggregated group or collection capable of relative movement with respect to each other so that the aggregated group or collection as a whole is capable of flexing movement when contained between first and second sheets 150 and 166 as hereinafter described. Flexible matrix 184 may in general comprise a matrix material selected from those discussed above in connection with the previous embodiments of the present invention so long as matrix 184 remains flexible and can include a toxicant such as those toxicants discussed above. Alternatively, should monitoring of suspected insect activity without insect control be desired, flexible matrix 184 may be utilized without toxicant.

Each sheet interior surface 151 may be fixed to lower surface 168 of second sheet 166 by folding along first fold line 185 and attaching first sheet 150 and second sheet 166 together along first path sides 186 which at least partially surround sheet first orifice 153 and view port 172. Thereafter, flexible matrix 184 may be placed into volume 188 (see FIG. 16) defined between each first sheet 150 and second sheet 166, and sealed into place by fixing sheet interior surface 151 to lower surface 168 at first path interior side 190 preferably while preserving the pliable, flexible nature of matrix 184, first sheet 150 and second sheet 166. Such fixing may be accomplished by heat sealing or a number of other means well known to those of ordinary skill in the art.

Referring to FIGS. 12–16, each inside surface 182 of third sheet 180 may be demountably attached to upper surface 170 of second sheet 166 by folding along second fold line 192 and pressing together, for demountable attachment along second path 194 which at least partially surrounds view port 172. Fold line perforations 193 are provided for detachment of third sheet 180 from second sheet 166 as will be described. Demountable attachment of third sheet 180 to second sheet 166 may be accomplished using releasable adhesive 196 disposed on inside surface 182 of third sheet 180, or by any of a number of other modes of demountable attachment including attachment using a zipper, attachment using hook and loop fasteners, and attachment using a plurality of snaps.

Referring to FIG. 13, sheet exterior surface 152 of first sheet 150 may be detachably mounted to non-planar mounting surface 197 (see FIG. 14) proximate to the insects at third path 198 surrounding sheet first orifice 153 by any of a variety of means, such as foam adhesive tape 199, although it will be recognized that numerous other modes of flexibly detachably mounting first sheet 150 to non-planar mounting surface 197 may be utilized. As will be discussed, each pliable (i.e., flexible) housing unit 200 (see FIG. 14) formed by a first sheet 150, a second sheet 166 and a third sheet 180 may also be detachably mounted to upper surface 170 of second sheet 166 of a second pliable housing unit 200 after third sheet 180 has been detached from a second pliable housing unit 200 by detaching along fold line perforations 193.

By forming first sheet 150, second sheet 166, third sheet 180 and matrix 184 of pliable, flexible materials, by fixing first sheet 150 to second sheet 166, by demountably attaching third sheet 180 to second sheet 166, and by detachably mounting first sheet 150 to non-planar mounting surface 197 or to another second sheet 166 so that their pliable, flexible characteristics are preserved, each pliable housing unit 200 may be disposed in conforming attachment to an uneven, non-planar surface. Of course, it will be appreciated that each pliable housing unit 200 may be mounted to a generally planar surface with equal efficacy. Also, first sheet 150, second sheet 166 and third sheet 180 are capable of maintaining an environment within volume 188 that has relatively restricted air movement, controlled moisture evaporation, and is essentially light-free.

Figure 14:
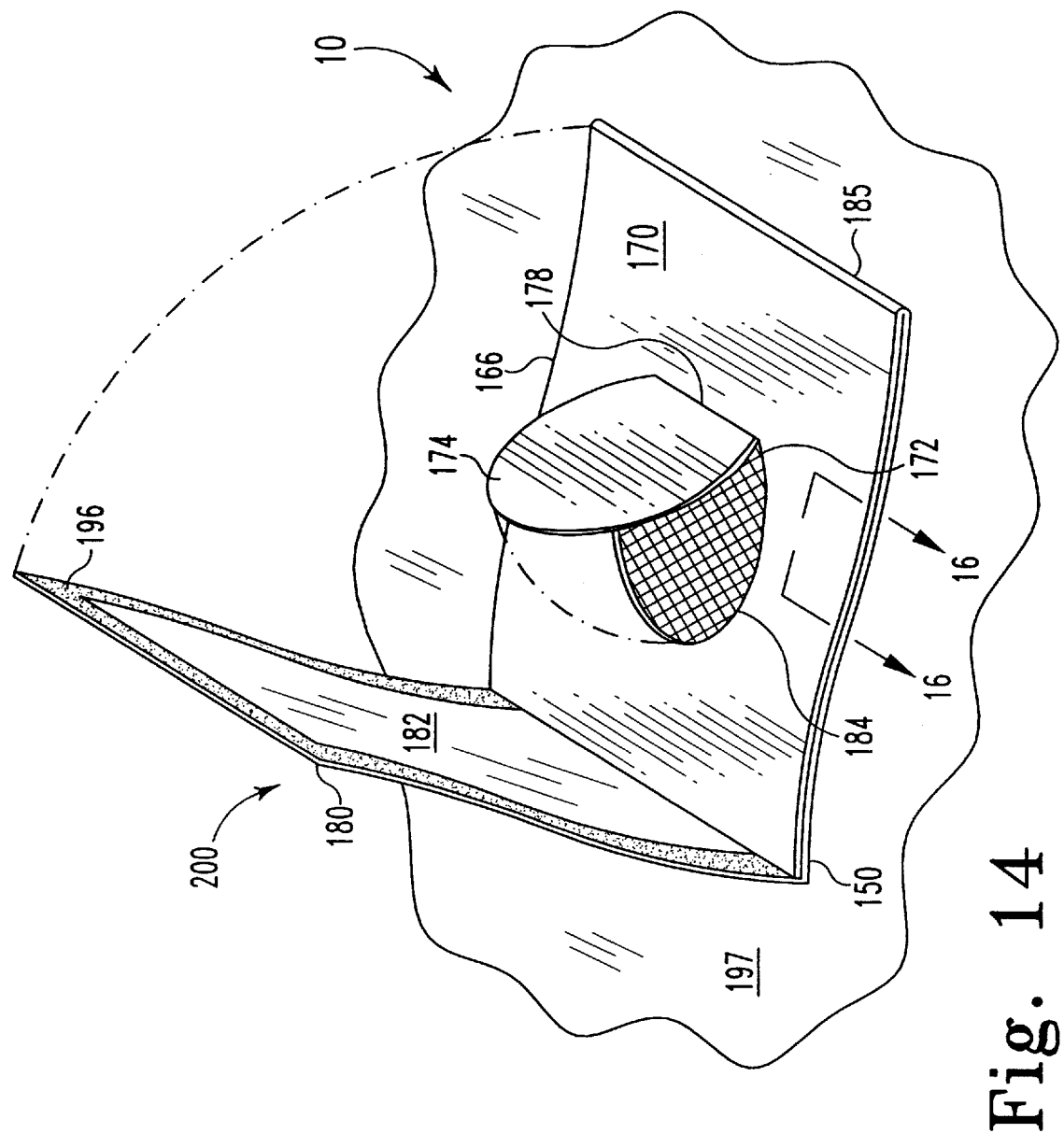
FIG. 14 is a perspective view of the third embodiment of an apparatus for pest monitoring or control representing the present invention.

In a method of the present invention, flap 154 may be removed from first sheet 150 of a pliable housing unit 200 to expose flexible matrix 184. In those instances where a second flap 162 has been provided, second flap 162 may be removed from flap 154 while maintaining flap 154 in connection with first sheet 150 in order to expose a relatively smaller area of flexible matrix 184, with the area of flexible matrix 184 to be exposed in a particular situation selected on the basis of a number of factors including insect activity, placement characteristics, and environmental factors such as expected temperature and humidity ranges. Next, where foam adhesive tape 199 has been provided with a removable backing during storage and handling, such removable backing will be removed, and pliable housing unit 200 may be detachably mounted to non-planar mounting surface 197 proximate to the insects, typically after appropriately selecting and preparing mounting surface 197 for intervention by creating a pathway for the insects to gain access to mounting surface 197. Referring to FIG. 14, in many instances it may be preferable to mount pliable housing unit 200 so that viewing flap 174 is disposed to be upwardly liftable, in order to help prevent entry of extraneous material into pliable housing unit 200 in the event that third sheet 180 does not form a tight attachment to second sheet 166. Due to the pliable, flexible nature of each pliable housing unit 200, it is possible to detachably mount a pliable housing unit 200 to surfaces that are curved, undulating, rough, uneven or otherwise distinctly non-planar.

After mounting pliable housing unit 200 to non-planar mounting surface 197, third sheet 180 is peeled back from second sheet 166 to reveal upper surface 170. Thereafter, viewing flap 174 is bent away from second sheet 166 at perforated edge 178 to reveal a portion of flexible matrix 184 through view port 172. Moisture may be added to flexible matrix 184, for instance by injecting water at multiple points in flexible matrix 184 using a syringe until the moisture content is in a desired range, which may be 65% to 70% total moisture for some applications. After moisture content is adjusted, viewing flap 174 is bent back to cover view port 172, and third sheet 180 is reattached to second sheet 166, whereupon pliable housing unit 200 is prepared for use.

Subsequently, insect consumption of flexible matrix 184 may be monitored by peeling back third sheet 180 from second sheet 166, and bending viewing flap 174 away from second sheet 166 to reveal flexible matrix 184 through view port 172. Where second sheet 166 and third sheet 180 have been formed from transparent or translucent materials, inspection of flexible matrix 184 may be accomplished by directly viewing through second sheet 166 and third sheet 180, without peeling third sheet 180 from second sheet 166 or bending viewing flap 174 away from second sheet 166.

In the event that a substantial portion of toxicant-containing flexible matrix 184 has been consumed, additional toxicant may be delivered to the insects by adding more toxicant-containing flexible matrix to the location where the pest feeding has occurred or by detaching third sheet 180 from second sheet 166 at fold line perforations 193 (see FIG. 12) and detaching viewing flap 174 from second sheet 166 at perforated edge 178, thereby exposing view port 172. Next, another pliable housing unit 200 is prepared for use as previously described, and mounted to upper surface 170 of second sheet 166 of the original pliable housing unit 200 by alignment with the original pliable housing unit 200 so that view port 172 of the original pliable housing unit 200 aligns with sheet first orifice 153 of the other pliable housing unit 200, or by mounting the other pliable housing unit 200 partially to the upper surface of second sheet 166 of the original pliable housing unit 200 and partially to non-planar mounting surface 197 so that view port 172 of the original pliable housing unit 200 at least partially overlaps with sheet first orifice 153 of the other pliable housing unit 200. Due to the flexible characteristics of each pliable housing unit 200, the second pliable housing unit 200 may be disposed in conforming attachment to the original pliable housing unit 200, and this attachment may be accomplished by any of a variety of modes of flexible detachable mounting, including foam adhesive tape. In this way, insects may move from flexible matrix 184 of the original pliable housing unit 200 to flexible matrix 184 of the second pliable housing unit 200.

It will of course be appreciated that after a substantial portion of flexible matrix 184 of the second pliable housing unit 200 has been consumed, a third pliable housing unit 200 may be added by mounting to the second pliable housing unit 200 in a manner similar to that previously described with respect to mounting the second pliable housing unit 200 to the original pliable housing unit 200. Further additional pliable housing units 200 may be similarly added, thereby forming a flexible or pliable stack of pliable housing units 200. Also, due to demountable attachment of each pliable housing unit 200 to non-planar mounting surface 197 or to another pliable housing unit 200, a stack of pliable housing units 200 may be disassembled and reassembled with the relative position of individual pliable housing units 200 within the stack being thereby changeable, or with the removal of a pliable housing unit 200 whose flexible matrix 184 has been substantially consumed. Although removal of the original pliable housing unit 200 from non-planar mounting surface 197 may in some instances be appropriate, in general, original pliable housing unit 200 will be left in place, attached to non-planar mounting surface 197, in order to provide insects with a familiar and stable interface between their environment inside non-planar mounting surface 197 and pliable housing units 200 attached to original pliable housing unit 200.

Figure 17:
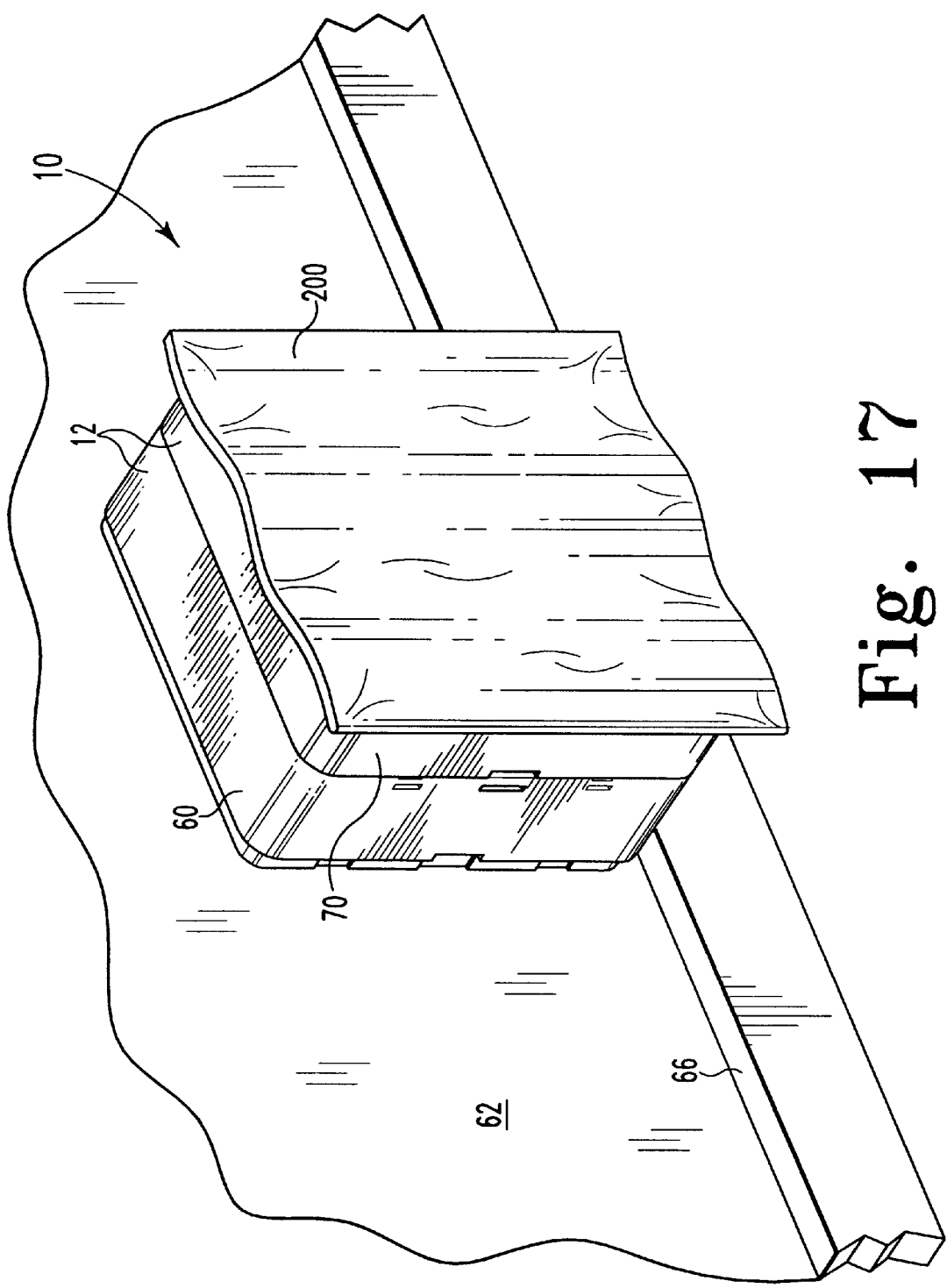
FIG. 17 is a perspective view of the first and third embodiments of an apparatus for pest monitoring or control representing the present invention.

Clearly, the first and third embodiments of the present invention may be used concurrently when the relative sizes of housings 12 and pliable housing units 200 are appropriately selected. As depicted in FIG. 17, for example, primary housing 60 may be attached to mounting surface 62, secondary housing 70 may be mounted to primary housing 60, and a pliable housing unit 200 may be prepared for use as previously described and mounted to second exterior surface 14 of secondary housing 70 by disposing pliable housing unit 200 so that housing second orifice 28 of secondary housing 70 aligns with sheet first orifice 153 of pliable housing unit 200, with attachment of pliable housing unit 200 to secondary housing 70 accomplished by any of a variety of modes of flexible detachable mounting, including foam adhesive tape. In the event that no secondary housing 70 is present, pliable housing unit 200 may be attached to primary housing 60, and in addition, the first embodiment of the present invention may be used with the fourth embodiment of the present invention in a manner entirely similar to that previously described.

Figure 18:
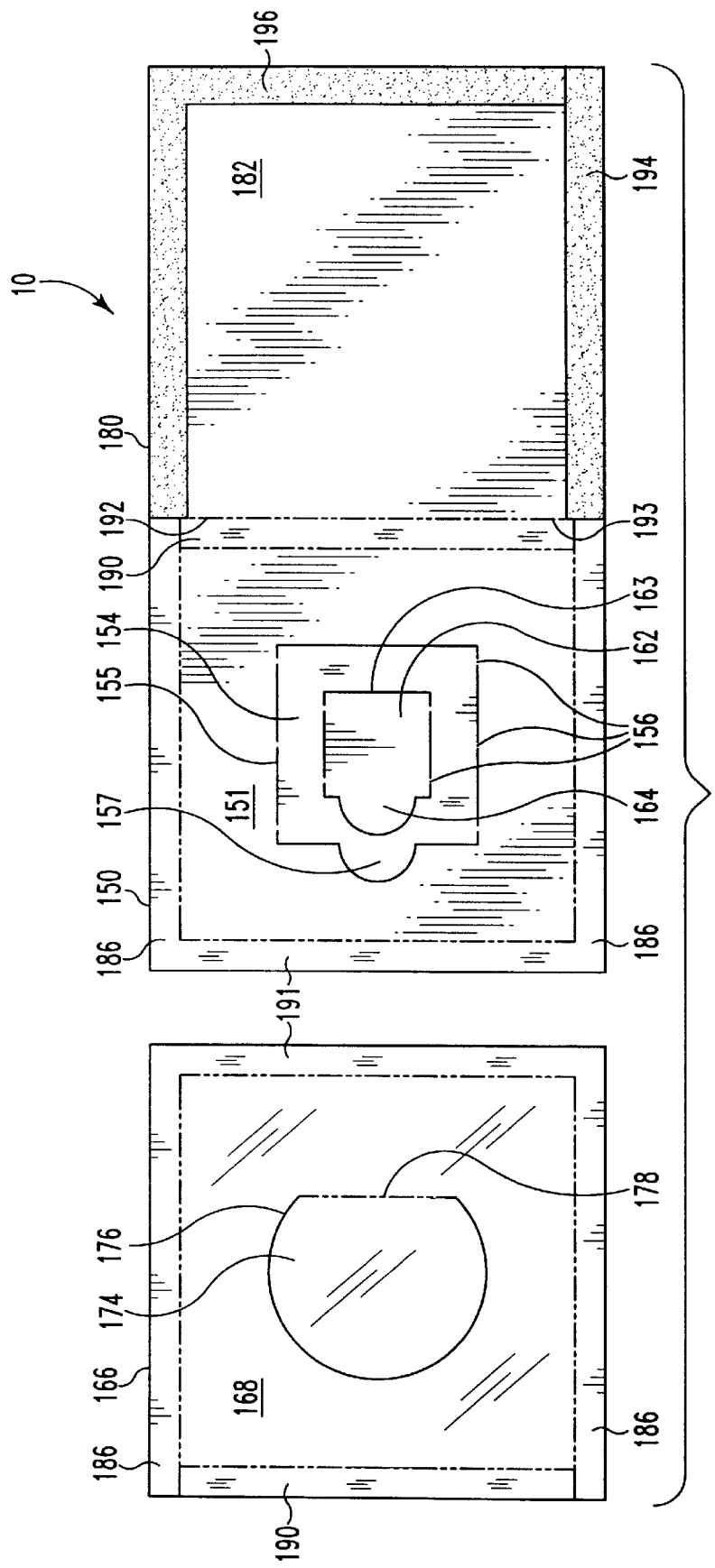
FIG. 18 is a top plan view of sheet portions of a fourth embodiment of an apparatus for pest monitoring or control representing the present invention.
Figure 19:
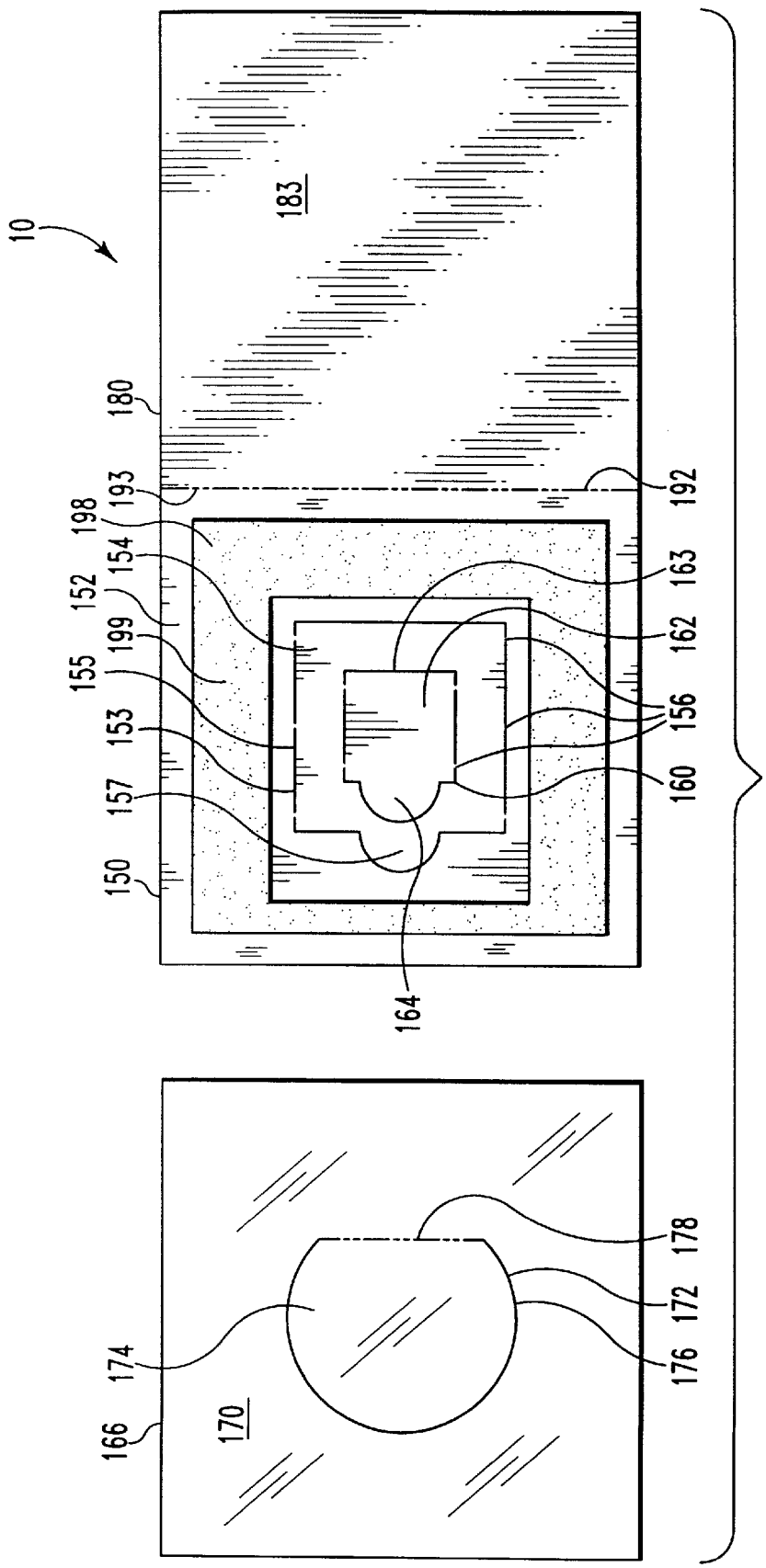
FIG. 19 is a bottom plan view of the sheet portions of the fourth embodiment of an apparatus for pest monitoring or control representing the present invention.

In a fourth embodiment of the present invention, as depicted in FIGS. 18 and 19, each of the first and third sheets 150 and 180 may be integrally formed from a single piece of a thin, flexible, generally planar opaque material, while each second sheet 166 may be separately formed of a thin, flexible generally planar, transparent or translucent material. Sheet interior surface 151 of first sheet 150 may be fixed to lower surface 168 of second sheet 166 by attaching together along first path sides 186 and first path exterior side 191, followed by placing flexible matrix 184 into volume 188 and sealing into place at first path interior side 190. With second sheet 166 formed of a transparent or translucent material, monitoring of insect consumption of flexible matrix 184 may be accomplished by peeling back third sheet 180 from second sheet 166 revealing transparent or translucent second sheet 166. In addition, viewing flap 174 may be bent away from second sheet 166 at perforated edge 178 for direct inspection of flexible matrix 184 through view port 172.

In a fifth embodiment of the present invention, as depicted in FIGS. 20–23, apparatus 10 includes a plurality of housings 312, each preferably formed of a durable material which is preferably resilient, essentially non-biodegradable, and temperature and ultraviolet radiation degradation resistant, such as any of various well-known polymers, including polystyrene, as well as non-corrosive metals and wax. Each housing 312 is similar to housing 12 of the first embodiment but is not depicted as having a square-like shape as housing 12 is depicted in FIGS. 1–6. Each housing 312 includes generally planar first exterior surface 313 (see FIG. 23), opposing, generally planar second exterior surface 314 (see FIG. 21), and defines interior chamber 315 capable of containing at least one matrix 316, typically two matrices 316, within surrounding inner surface 320 (see FIG. 21) partially defining interior chamber 315. A suitable matrix can be selected from those discussed above in connection with the previous embodiments of the present invention and can either include a toxicant selected from those discussed above or not include a toxicant.

Figure 21:
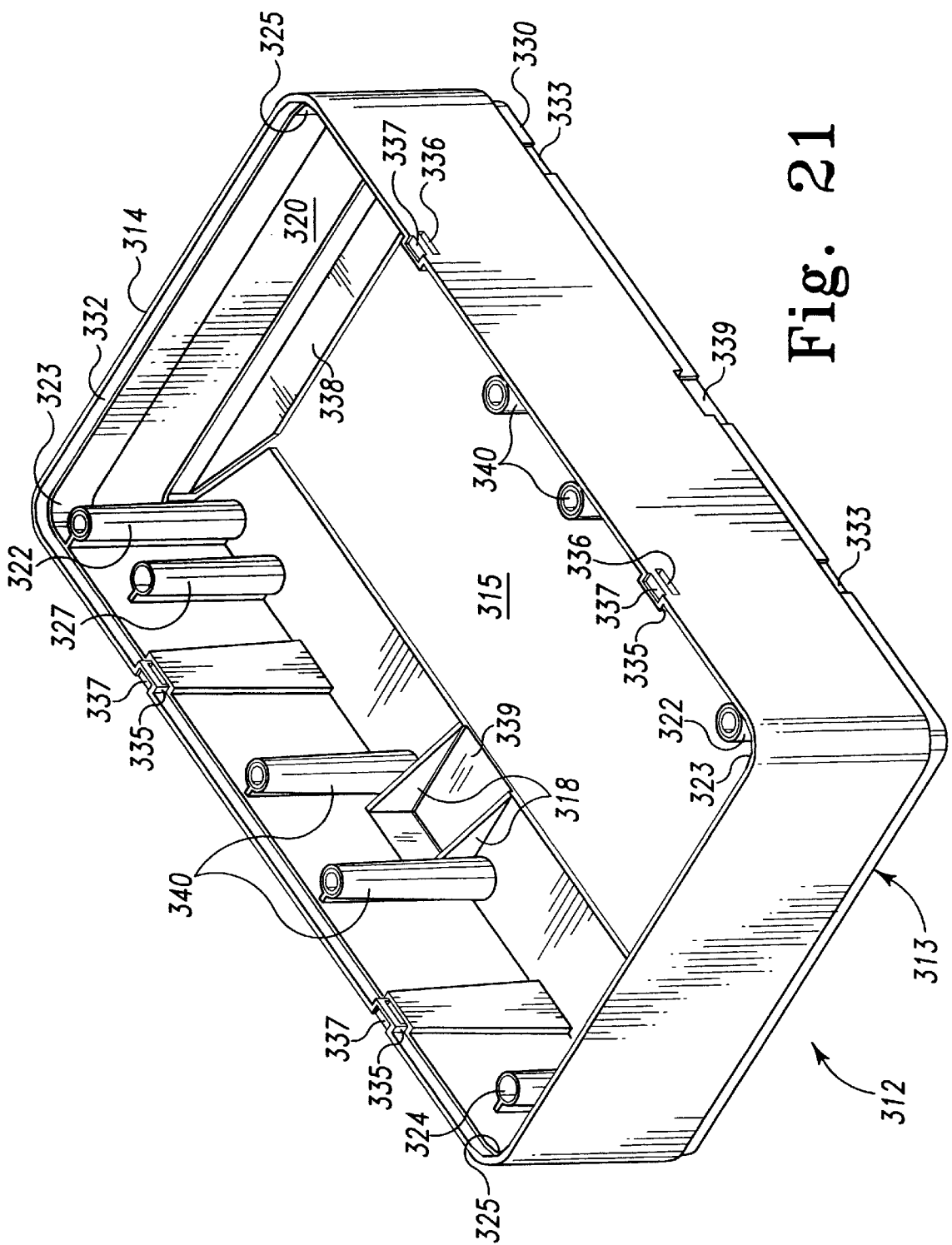
FIG. 21 is an enlarged perspective view of a housing of the fifth embodiment of an apparatus for pest monitoring or control representing the present invention.

Referring to FIG. 21, self-tapping stanchions 322 are attached to inner surface 320 proximate to opposing first corners 323, two bored stanchions 324 (only one bored stanchion 324 is shown in FIG. 21) are similarly attached to inner surface 320 proximate to opposing second corners 325, and two bored stanchions 327 (only one bored stanchion 327 is shown in FIG. 21) are similarly attached to inner surface 320 proximate to self-tapping stanchions 322. Each housing 312 defines housing first orifice 326 (see FIG. 23) disposed between first exterior surface 313 and interior chamber 315, and housing second orifice 328 (see FIG. 22) disposed between second exterior surface 314 and interior chamber 315. Proximate to first exterior surface 313, each housing 312 further includes perimeter shoulder (lip) 330, and proximate to second exterior surface 314, each housing 312 includes perimeter step 332, whereby first exterior surface 313 of each housing 312 is capable of mating engagement with second exterior surface 314 of another housing 312. Disposed at each perimeter shoulder (lip) 330 are a plurality of channels 333, with each channel 333 including a barbed, outwardly projecting, latching finger 334 (see FIG. 23) which is adapted to function as a one way snap mechanism. Positioned at each step 332 is a plurality of inwardly projecting notches 335 disposed to correspond with channels 333 of another housing 312. Each notch 335 includes slot 336, so that one housing 312 may be attached to another housing 312 by snapping each finger 334 into one corresponding slot 336 as first exterior surface 313 of housing 312 is positioned in mating engagement with second exterior surface 314 of another housing 312. Each housing 312 may be removably and interchangeably connected to other housings 312 by relative flexure of fingers 334 with respect to slots 336 and disposing each finger 334 into one slot 336. Housings 312 can also be removably and interchangeably connected to other housings 312 by inserting appropriate fasteners, e.g., screws, through bored stanchions 327 of one housing 312 into bored stanchions 327 of another housing 312. Detachment of housings 312 so positioned in mating engagement may be effectuated by use of a bladed instrument, such as a screwdriver, into one of pry grooves 337 defined in each housing 312 proximate to second exterior surface 314, and if fasteners have been used to secure mated housings 312 together by inserting the fasteners through the bored stanchions 327 thereof, by removing the fasteners from the bored stanchions 327. In addition, each of housings 312 may be removably and interchangeably connected to other housings 312 using any of a variety of other connecting means rather than the previously described fingers and slots and/or fasteners and bored stanchions 327.

Figure 22:
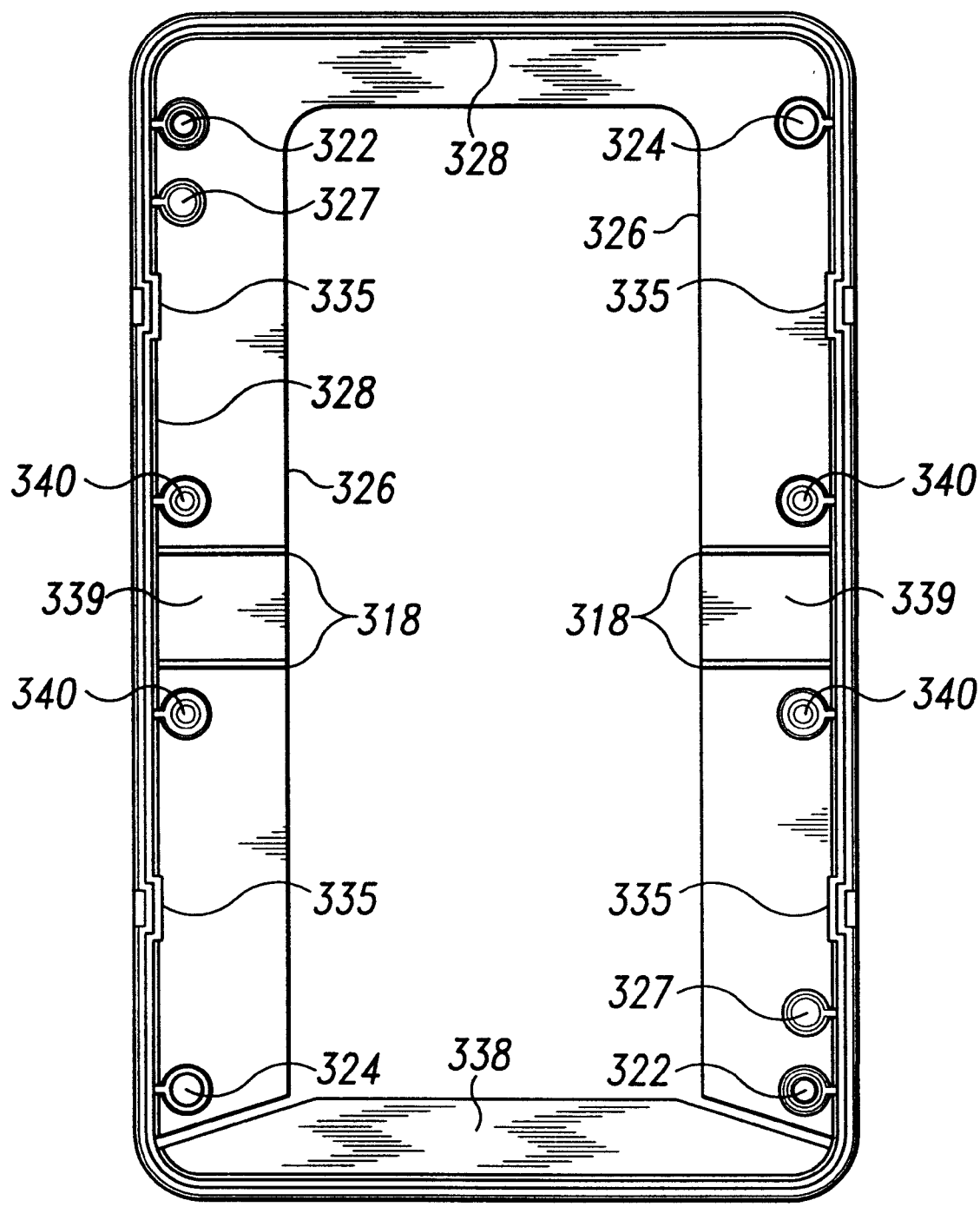
FIG. 22 is an enlarged top plan view of the housing of the fifth embodiment of an apparatus for pest monitoring or control representing the present invention.

The configuration of housing first orifice 326 may be modified by removing one or more breakout portions, including large breakout portion 338 and opposing small breakout portions 339 disposed between interior uprights 318. Of course, it will be recognized that the breakout portions illustrated in FIGS. 21 and 22 are exemplary only, and that additional breakout portions may be disposed at numerous locations in housing 312. Housing 312 further comprises four partially bored stanchions 340 attached to inner surface 320 proximate the small breakout portions 339 and interior uprights 318.

Figure 20:
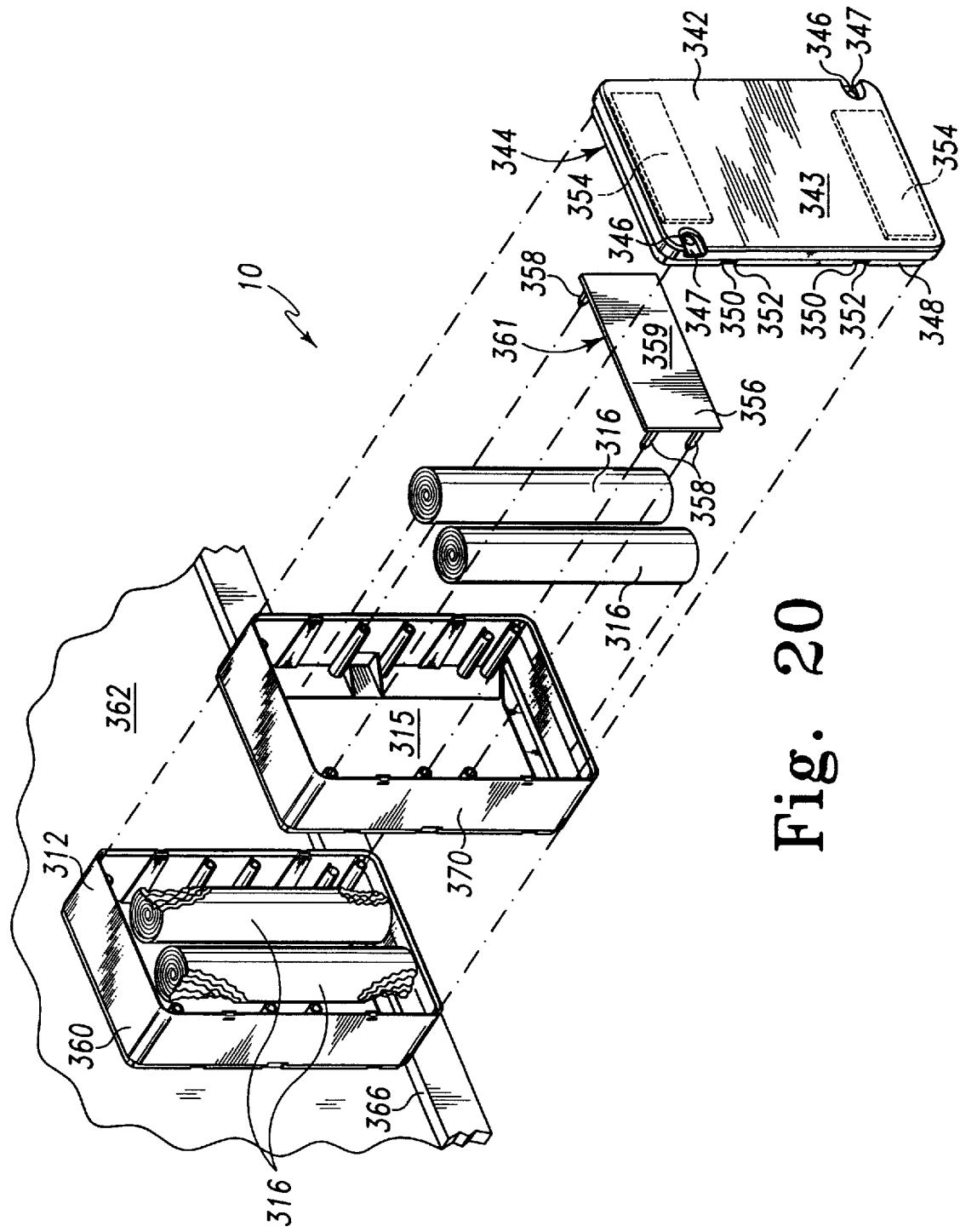
FIG. 20 is an exploded perspective view of a fifth embodiment of an apparatus for pest monitoring or control representing the present invention.

Referring to FIG. 20, cover 342 is similar to cover 42 of the first embodiment but is not depicted as having a square-like shape as cover 42 is depicted in FIGS. 1–2 and 7–8. Instead, cover 342 is depicted in FIG. 20 as having merely a rectangular shape. In all other respects, cover 342 is the same as cover 42 of the first embodiment. Referring to FIG. 20, cover 342 includes generally planar cover outside surface 343 and generally planar cover inside surface 344 which opposes cover outside surface 343. Although not shown, cover 342 also includes a pair of cover stanchions disposed adjacent to cover inside surface 344 proximate to diagonally opposite corners of cover 342. Like cover 42 of the first embodiment, cover 342 is preferably formed of a durable material which is preferably resilient, essentially non-biodegradable, and resistant to temperature and ultraviolet radiation degradation, such as any of various well-known polymers, non-corrosive metals and wax. Each cover stanchion defines cover bore 346 extending therethrough, and cover outside surface 343 defines a pair of countersunk portions 347 corresponding with cover bores 346. Cover bores 346 are disposed for alignment with self-tapping stanchions 322 (see FIG. 21) of housing 312 when cover 342 is mounted to housing 312, as will be described. Cover 342 further includes cover perimeter shoulder 348, and disposed at cover perimeter shoulder 348 is a plurality of cover channels 350, with each cover channel 350 including a smooth, outwardly projecting cover finger 352. Consequently, cover 342 is capable of mating engagement with second exterior surface 314 (see FIG. 21) of housing 312 by snapping each cover finger 352 into one corresponding slot 336 of housing 312. Cover 342 positioned in mating engagement with housing 312 may be detached using a bladed instrument within pry grooves 337. Cover 342 may be removably and interchangeably connected to any housing 312 by relative flexure of cover fingers 352 with respect to slots 336 and disposing each cover finger 352 in one slot 336. Further, cover 342 may be removably connected to housing 312 using any of a variety of connecting means rather than the previously described cover fingers 352 and slots 336. For instance, as previously noted, cover bores 346 are disposed for alignment with self-tapping stanchions 322, so that when cover 342 is engaged with housing 312, further attachment of cover 342 to housing 312 may be accomplished by using a threaded fastener, such as a self-tapping screw, not shown, disposed through each cover bore 346 and threadably engaged in each self-tapping stanchion 322. Preferably mounted to cover inside surface 344 are one or more moisture units 354 which can be used to adjust moisture content within the present invention. Moisture units 354 may be formed of any suitable moisture retaining material, for example, an absorbent, sponge-like material, and mounted to cover inside surface 344 for instance, by adhesive.

Figure 23:
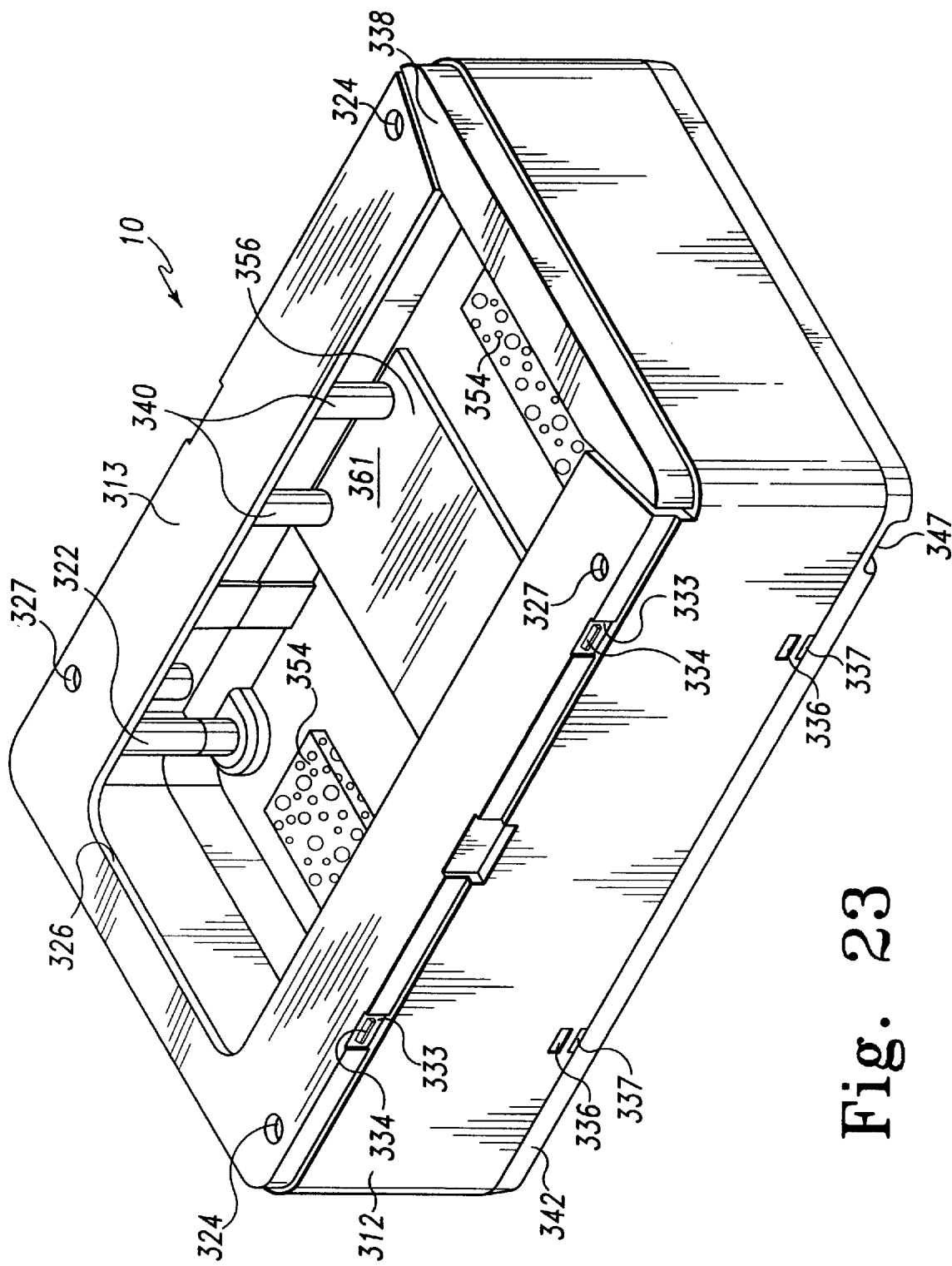
FIG. 23 is an enlarged bottom perspective view of the fifth embodiment of an apparatus for pest monitoring or control representing the present invention, shown without a matrix.

Referring to FIGS. 20 and 23, generally planar matrix holding plate 356 has generally planar outside surface 359 and generally planar inside surface 361 which opposes outside surface 359. Projecting away from inside surface 361 are posts 358. Typically, there are four posts 358, and posts 358 extend generally perpendicularly away from inside surface 361. Matrix holding plate 356 may be mounted to housing 312 by inserting each post 358 of matrix holding plate 356 into one partially bored stanchion 340 of housing 312. Matrix holding plate 356 may be either permanently or removably attached to housing 312. For instance, posts 358 and partially bored stanchions 340 can be sized in a manner well known to those skilled in the art such that matrix holding plate 356 is adapted to be either permanently or removably attached to housing 312. In a preferred embodiment of the invention, posts 358 and partially bored stanchions 340 are sized in such a manner that once posts 358 are received in partially bored stanchions 340, any attempt to remove matrix holding plate 356 from housing 312 would result in breakage and detachment of posts 358 from inside surface 361 of matrix holding plate 356. This design would typically be utilized to deter the removal by pest control operators of matrix holding plate 356 from housing 312 as a means of replacing spent matrices 316 with new matrices 316. It is also contemplated that matrix holding plate 356 can be integrally formed with housing 312 or otherwise suitably attached to housing 312 utilizing any of a variety of fasteners, adhesives, or the like. Matrix holding plate 356 serves to operably hold matrix 316 in place in interior chamber 315, and may also display instructions, notices, and other pertinent information to users upon removal of cover 342 from housing 312.

The apparatus 10 of the fifth embodiment including housing 312 can be used in the above-described methods of the invention in the same manner as described in connection with the first embodiment and housing 12. In the event that mounting surface 362 is non-planar and defines an edge 366 through which insect access to the present invention is to occur, one or more different-sized breakout portions may be provided in primary housing 360 and utilized in the same manner as described above with respect to primary housing 60.

Insect consumption of matrix 316 may be monitored by viewing through cover 342 where cover 342 is transparent or translucent, or by removing cover 342 from primary housing 360 when an essentially light-free environment is being maintained to reveal matrix 316 through housing second orifice 328 (see FIG. 22), while maintaining primary housing 360 in place with respect to mounting surface 362. In the event that a substantial portion of toxicant-containing matrix 316 has been consumed, as illustrated in FIG. 20 by matrix 316 present in primary housing 360, additional toxicant may be delivered to the insects by mounting another housing 312, referred to as secondary housing 370, to primary housing 360 by snapping fingers 334 (see FIG. 23) of secondary housing 370 into slots 336 (see FIG. 21) of primary housing 360. In this way, secondary housing 370 is positioned in mating engagement with primary housing 360, with first exterior surface 313 (see FIG. 23) of secondary housing 370 disposed adjacent to second exterior surface 314 (see FIG. 21) of primary housing 360, and housing first orifice 326 (see FIG. 23) of secondary housing 370 communicating with housing second orifice 328 (see FIG. 22) of primary housing 360. Consequently, insects present in interior chamber 315 defined by primary housing 360 may freely move into interior chamber 315 of secondary housing 370 and begin to consume matrix 316 therein. By attachment of cover 342 to secondary housing 370 in the manner previously described with respect to attachment to primary housing 360, the present invention may be constituted in an extended, stacked form, providing additional matrix 316 in an environment where the interface between mounting surface 362 and primary housing 360 has remained largely undisturbed, whereby insects may move from matrix 316 of primary housing 360 to matrix 316 of secondary housing 370 with minimal disruption to their feeding environment.

Clearly, after a substantial portion of matrix 316 of secondary housing 370 has been consumed, as may be revealed from periodic monitoring of activity in secondary housing 370, yet another housing 312 may be added by mounting to secondary housing 370 in a manner similar to that previously described with respect to mounting of secondary housing 370 to primary housing 360. Further additional housings 312 may be similarly added, thereby forming an extended stack of housings 312 attached to primary housing 360. Addition of housings 312 does not disturb the pre-existing network of access galleries or passageways previously established between the termite colony or nest and primary housing 360.

A stack of housings 312 mounted to primary housing 360 may be disassembled and reassembled with the relative position of individual housings 312 within the stack being thereby interchangeable, or with the removal of selected housings 312 in which matrix 316 has been substantially consumed. Also, placement of a new, unused housing 312 between a housing 312 having current insect activity and primary housing 360 may induce the insects to eat through matrix 316 of the new housing 312 to return to primary housing 360.

It will be recognized that although removal of primary housing 360 from mounting surface 362 may in some instances be appropriate, in general, primary housing 360 will be left in place, attached to mounting surface 362, in order to provide insects with a familiar and stable interface between the environment inside mounting surface 362 and housings 312 attached to primary housing 360.

In the event that matrix holding plate 356 is removably mounted to housing 312 and after all or a portion of matrix 316 in housing 312 has been consumed, if desired, a new, replacement matrix 316 may be disposed in housing 312 by removing matrix holding plate 356 from housing 312, placing the new replacement matrix 316 within interior chamber 315 after removal of any remaining portion of original matrix 316, and thereafter replacing matrix holding plate 356 by inserting posts 358 of matrix holding plate 356 into partially bored stanchions 340 of housing 312.

As described above with respect to housings 12 and the second embodiment of the present invention, two or more housings 312 can also be arranged in side-by-side arrangement in the same fashion. In addition, as described above with respect to housings 12 and the concurrent use of the first and second embodiments of the invention, housings 312 may also be arranged in concurrent side by side and stacked fashion wherein each housing 312 may act as a primary housing 360 by attachment thereto of one or more secondary housings 370.

The present invention contemplates a number of methods and apparatus which may be utilized, with particular methods and apparatus optimized for a particular target pest and environmental settings apparent to a person skilled in this art using the teachings provided herein. Although the descriptions and teachings primarily focus on the control of termites, it will be recognized that variations of these methods and apparatus and their applicability to insects and pests other than termites would be readily recognized and used by a person skilled in this art. The present invention having been described in its preferred embodiments, it is clear that the present invention is susceptible to numerous modifications and embodiments within the ability of those skilled in the art without departing from the scope of the invention and without the exercise of inventive faculty. In particular, geometric shapes other than rectangular or square housings and apparatus can be used without necessarily departing from the scope of the present invention. Accordingly, the scope of the present invention is defined as set forth by the scope of the following claims.

What is claimed is:

1. A connectable device for use in monitoring or controlling pests comprising:

a primary housing having an exterior surface and defining an interior chamber and a plurality of orifices disposed between the exterior surface and the interior chamber;

connecting means for connecting the primary housing to a secondary housing in a stacked configuration wherein an exterior surface of the primary housing contacts an exterior surface of the secondary housing and at least one of the orifices of the primary housing at least partially aligns with an orifice defined by the secondary housing so that the interior chamber of the primary housing communicates with an interior chamber defined by the secondary housing; and mounting means for mounting the exterior surface of the primary housing to a mounting surface of a structure proximate to the pests so that at least one of the orifices of the primary housing is disposed adjacent to the mounting surface to provide a pathway between the interior chamber of the primary housing and the structure.

2. The connectable device of claim 1 further comprising means for adjusting moisture content within the chamber of the primary housing.

3. The connectable device of claim 1 further comprising means for enlarging at least one of the orifices of the primary housing to a preselected size.

4. The connectable device of claim 1 further comprising a pest-edible matrix and means for holding the matrix within the chamber of the primary housing.

5. The connectable device of claim 4 wherein the matrix includes a toxicant.

6. The connectable device of claim 1 further comprising a cover for essentially covering at least one of the orifices of the primary housing.

7. The connectable device of claim 6 wherein the cover is capable of being removably connected to the primary housing.

8. The connectable device of claim 6 wherein the primary housing and the cover are capable of providing an environment within the chamber that has restricted air movement so as to minimally disturb foraging insects, and controlled moisture evaporation.

9. An apparatus for monitoring or controlling pests comprising:

a plurality of housings, each having an exterior surface and defining an interior chamber and a plurality of orifices disposed between the exterior surface and the interior chamber;

connecting means for connecting each of the housings to at least one other of the housings such that at least two of the housings are in communication through their orifices so that the interior chambers of those housings are in communication with each other wherein the at least two housings which are in communication with each other through their respective communicating orifices each have an exterior surface which contacts an exterior surface of another housing and the at least two housings are either in a stacked configuration or side-by-side configuration;

mounting means for mounting the exterior surface of at least one of the housings to a mounting surface proximate to the pests such that at least one of the orifices is disposed adjacent to the mounting surface; and at least one cover for essentially covering each orifice which would otherwise remain uncovered if not for the presence of a cover.

10. The apparatus of claim 9 wherein the connecting means includes means for removably connecting each of the housings to at least one other of the housings.

11. The apparatus of claim 9 wherein the cover is movable between a first position covering at least one of the orifices and a second position wherein at least one orifice is uncovered.

12. The apparatus of claim 9 wherein the housings are substantially similar and interchangeable.

13. The apparatus of claim 9 wherein the housings and the covers are adapted to provide an environment within at least one of the interior chambers that has restricted air movement so as to minimally disturb foraging insects, controlled moisture evaporation, and is substantially light-free.

14. The apparatus of claim 9 further comprising means for adjusting moisture content within at least one of the chambers.

15. The apparatus of claim 9 further comprising means for enlarging at least one of the orifices to a preselected size.

16. The apparatus of claim 9 further comprising a plurality of pest-edible matrices and means for holding at least one of the matrices within each of the chambers.

17. The apparatus of claim 16 wherein at least one of the matrices includes a toxicant.

18. An apparatus for monitoring or controlling pests comprising:

a plurality of housings including a primary housing and at least one secondary housing, each housing having a first exterior surface and a second exterior surface and defining an interior chamber, a first orifice disposed between the first exterior surface and the interior chamber, and a second orifice disposed between the second exterior surface and the interior chamber;

mounting means for mounting the first exterior surface of the primary housing to a mounting surface proximate to the pests to be monitored or controlled so that the interior chamber defined by the primary housing is in communication with the mounting surface through the first orifice defined by the primary housing;

connecting means for connecting each of the secondary housings to at least one other of the housings such that the first exterior surface of each secondary housing contacts the second exterior surface of another secondary housing or the primary housing so that the first orifice of each secondary housing is in communication with the second orifice of the housing to which it is connected and the interior chambers of connected housings are in communication with each other; and a cover for covering the second exterior surface of the secondary housing which does not have its secondary exterior surface in contact with an exterior surface of another housing.

19. The apparatus of claim 18 wherein the housings are substantially similar and interchangeable.

20. The apparatus of claim 18 wherein the apparatus includes means for providing an environment within each of the interior chambers that has restricted air movement so as to minimally disturb foraging insects, controlled moisture evaporation, and is essentially light-free.

21. The apparatus of claim 18 further comprising means for adjusting moisture content within at least one of the chambers.

22. The apparatus of claim 18 further comprising means for enlarging the first orifice of the primary housing to a preselected size.

23. The apparatus of claim 18 wherein the connecting means includes means for removably connecting each of the housings to at least one other of the housings.

24. The apparatus of claim 18 further comprising a plurality of pest-edible matrices and means for holding the matrices within the chambers.

25. The apparatus of claim 24 wherein at least one of the matrices includes a toxicant.

26. The apparatus of claim 18, wherein the cover and each of the housings is formed of a durable material.

27. The apparatus of claim 26, wherein the secondary housings are substantially similar and interchangeable, and may be disposed to form a stack of secondary housings capable of detachable connection to the primary housing, disassembly and reassembly with relative positions of the secondary housings within the stack being thereby changeable.

28. The apparatus of claim 17 wherein:

the cover is capable of removable attachment to one of the secondary housings to cover the non-communicating second exterior surface; and the cover and each of the connecting means includes a latching finger.

29. The apparatus of claim 27 wherein the connecting means includes a plurality of latching fingers for connecting the housings and a plurality of corresponding slots defined by the housings such that each of the secondary housings may be removably and interchangeably connected to at least one other housing by relative flexure of the fingers and the slots and disposing each of the fingers in one of the slots.

30. The apparatus of claim 27 wherein:

the housings and the cover are capable of providing an environment within the interior chambers that has restricted air movement so as to minimally disturb foraging insects, controlled moisture evaporation, and is essentially light-free; and the cover and each of the housings is formed of an essentially non-biodegradable material.

31. The apparatus of claim 27 further comprising means for adjusting moisture content within at least one of the chambers.

32. The apparatus of claim 27 wherein the first orifice of the primary housing is capable of being enlarged to a preselected size.

33. The apparatus of claim 27 further comprising a plurality of pest-edible matrices and means for holding the matrices within the chambers.

34. The apparatus of claim 33 wherein at least one of the matrices includes a toxicant.

35. An apparatus for monitoring or controlling pests comprising:

a plurality of housings, each having an exterior surface and defining an interior chamber, a first orifice disposed between the exterior surface and the interior chamber and a second orifice disposed between the exterior surface and the interior chamber;

mounting means for mounting the exterior surface of each of the housings to a mounting surface proximate to the pests in side-by-side arrangement so that each of the interior chambers is in communication with the mounting surface through the first orifice and in communication with each other through the second orifice.

36. The apparatus of claim 35 wherein each of the housings is formed of a durable material.

37. The apparatus of claim 36 wherein each of the housings defines a third orifice disposed between the exterior surface and the interior chamber, and further comprising means for covering the third orifices.

38. The apparatus of claim 37 wherein the apparatus includes means for providing an environment within the interior chambers that has relatively restricted air movement, controlled moisture evaporation, and is substantially light-free.

39. The apparatus of claim 36 wherein the housings are substantially similar and interchangeable.

40. The apparatus of claim 36 further comprising means for adjusting moisture content within at least one of the chambers.

41. The apparatus of claim 36 wherein at least one of the first orifices is capable of being enlarged to a preselected size.

42. The apparatus of claim 36 further comprising means for removably connecting each of the housings to another housing.

43. The apparatus of claim 36 further comprising a plurality of pest-edible matrices and means for holding the matrices within the chambers.

44. The apparatus of claim 43 wherein at least one of the matrices includes a toxicant.

45. A method for monitoring or controlling pests comprising the steps of:
placing a pest-edible matrix into an interior chamber defined within a first housing having an exterior surface and defining a plurality of orifices disposed between the exterior surface and the interior chamber, and having connecting means for connecting the exterior surface of the first housing such that on connection the exterior surface of the first housing contacts an exterior surface of at least one other housing having an interior chamber such that at least one of the orifices of the first housing is in communication with an orifice of a housing to which the first housing is connected; and
mounting at least one housing to a mounting surface of a structure proximate to the pests so that at least one orifice of a housing is disposed adjacent to the mounting surface to provide a pathway for the pests between the chamber formed by the interconnected housings and the structure.

46. The method of claim 45 further comprising the step of mounting a cover on the housing to essentially cover at least one of the orifices.

47. The method of claim 45 further comprising the step of adjusting moisture content within at least one of the chambers.

48. The method of claim 45 further comprising the step of enlarging at least one of the orifices disposed adjacent to the mounting surface to a preselected size.

49. A method for monitoring or controlling pests comprising the steps of:
placing a pest-edible matrix into at least one of a plurality of interior chambers, each of the interior chambers being defined within one of a plurality of housings, each housing having an exterior surface and defining a plurality of orifices disposed between the exterior surface and the interior chamber;
connecting the housings together whereby at least some of the orifices are at least partially aligned together and the interior chambers adjacent to the at least partially aligned orifices are disposed in communication with each other;
mounting the exterior surface of at least one of the housings to a mounting surface proximate to the pests so that at least one of the orifices is disposed adjacent to the mounting surface; and
mounting a plurality of covers on the housings to essentially cover at least some of the orifices which are not in direct communication with other orifices of other housings or disposed adjacent to the mounting surface.

50. The method of claim 49 further comprising the step of adjusting moisture content within at least one of the chambers.

51. The method of claim 49 further comprising the step of enlarging at least one of the orifices disposed adjacent to the mounting surface to a preselected size.

52. A method for monitoring or controlling pests comprising the steps of:
placing a pest-edible matrix into at least one of a plurality of interior chambers, each of the interior chambers being defined within one of a plurality of housings including a primary housing and at least one secondary housing, each housing having a first exterior surface and a second exterior surface and defining a first orifice disposed between the first exterior surface and the interior chamber and a second orifice disposed between the second exterior surface and the interior chamber wherein the first exterior surface of a housing is connectable to the second exterior surface of another housing;
mounting the first exterior surface of the primary housing to a mounting surface proximate to the pests so that the interior chamber of the primary housing is in communication with the mounting surface through the first orifice defined by the primary housing;
connecting each secondary housing to at least one other housing so that an exterior surface of each secondary housing is in contact with an exterior surface of a housing to which it is connected and the interior chambers of connected housings are in communication with each other; and
covering any exterior surface which is not in communication with the exterior surface of another housing, or with a mounting surface, with a cover.

53. The method of claim 52 further comprising the step of adjusting moisture content within at least one of the interior chambers.

54. The method of claim 52 further comprising the step of enlarging at least one of the first orifices disposed adjacent to the mounting surface to a preselected size.

55. A method for monitoring or controlling pests comprising the steps of:
placing a pest-edible matrix into at least one of a plurality of interior chambers, each of the interior chambers being defined within one of a plurality of housings including a primary housing and a plurality of interchangeable secondary housings, each housing being formed of a durable material, having a first exterior surface and a second exterior surface, and defining a first orifice disposed between the first exterior surface and the interior chamber and a second orifice disposed between the second exterior surface and the interior chamber;

mounting the first exterior surface of the primary housing to a mounting surface proximate to pests so that the interior chamber of the primary housing is disposed in communication with the mounting surface through the first orifice defined by the primary housing;

connecting each of the secondary housings to at least one other of the housings such that an exterior surface of the secondary housing contacts an exterior surface of the housing to which it is connected whereby the first orifice of each connected secondary housing is at least partially aligned with the second orifice of a housing to which it is connected so that the interior chambers adjacent to the at least partially aligned orifices are in communication with each other, and whereby a second exterior surface of one of the housings is not in direct communication with an exterior surface of another housing or disposed adjacent to the mounting surface, thereby forming a stack of secondary housings capable of detachable connection to the primary housing, disassembly and reassembly with relative position of the secondary housings within the stack being changeable; and mounting a cover formed of a durable material to cover any exterior surface and the orifice disposed therein which otherwise would be uncovered because the exterior surface is not connected to the exterior surface of another housing or disposed adjacent to the mounting surface.

56. The method of claim 55 further comprising the step of adjusting moisture content within at least one of the interior chambers.

57. The method of claim 55 further comprising the step of enlarging at least one of the first orifices disposed adjacent to the mounting surface to a preselected size.

58. A method for monitoring or controlling pests comprising the steps of:

placing a pest-edible matrix into at least one of a plurality of interior chambers, each of the interior chambers being defined within one of a plurality of housings formed of a durable material and having a first exterior surface and a second exterior surface and defining a first orifice disposed between the first exterior surface and the interior chamber and a second orifice disposed between the second exterior surface and the interior chamber;

attaching the first exterior surface of at least two of the housings to a mounting surface proximate to the pests so that the interior chamber defined by each of the housings mounted to the mounting surface is disposed in communication with the mounting surface through the first orifice of each of the housings; and connecting the second exterior surface of at least one of the housings to the first exterior surface of at least one other of the housings whereby at least two of the interior chambers are in communication with each other.

59. The method of claim 58 further comprising the step of enlarging at least one of the first orifices disposed adjacent to the mounting surface to a preselected size.

60. The method of claim 58 further comprising the step of adjusting moisture content within at least one of the interior chambers.

61. The connectable device of claim 1 wherein the pests are insects.

62. The connectable device of claim 61 wherein the insects are termites.

63. The apparatus of claim 9 wherein the pests are insects.

64. The apparatus of claim 63 wherein the insects are termites.

65. The apparatus of claim 18 wherein the pests are insects.

66. The apparatus of claim 65 wherein the insects are termites.

67. The method of claim 65 wherein the pests are insects.

68. The method of claim 67 wherein the insects are termites.

69. The method of claim 52 wherein the pests are insects.

70. The method of claim 69 wherein the insects are termites.

71. The method of claim 55 wherein the pests are insects.

72. The method of claim 71 wherein the insects are termites.

* * * * *